United States Patent
Li et al.

(10) Patent No.: US 11,831,516 B2
(45) Date of Patent: Nov. 28, 2023

(54) LOGICAL GROUPING OF NETWORK RESOURCES AND CONTROL AT SCALE

(71) Applicant: Microsoft Technology Licensing, LLC, Redmond, WA (US)

(72) Inventors: Jie Li, Bellevue, WA (US); Ashish Bhargava, Sammamish, WA (US); Mohamed N. Hassan, Redmond, WA (US); Parag Sharma, Redmond, WA (US); Neeraj Motwani, Sammamish, WA (US); Rishabh Tewari, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/565,234

(22) Filed: Dec. 29, 2021

(65) Prior Publication Data

US 2023/0136574 A1    May 4, 2023

Related U.S. Application Data

(60) Provisional application No. 63/263,379, filed on Nov. 1, 2021.

(51) Int. Cl.
*H04L 41/12* (2022.01)
*H04L 12/46* (2006.01)
(Continued)

(52) U.S. Cl.
CPC .......... *H04L 41/12* (2013.01); *H04L 12/4641* (2013.01); *H04L 12/66* (2013.01);
(Continued)

(58) Field of Classification Search
CPC ..... H04L 41/12; H04L 12/4641; H04L 12/66; H04L 41/18; H04L 63/205
See application file for complete search history.

(56) References Cited

U.S. PATENT DOCUMENTS 7,477,600 B1    1/2009  Mor et al.
11,088,919 B1 *  8/2021  Chandrashekhar ........................ H04L 63/0209
(Continued)

OTHER PUBLICATIONS

"Supplemental Terms of Use for Microsoft Azure Previews", Retrieved from: https://azure.microsoft.com/en-us/support/legal/preview-supplemental-terms/, Nov. 2021, 13 Pages.
(Continued)

*Primary Examiner* — Tonia L Dollinger
*Assistant Examiner* — Joseph M Cousins
(74) *Attorney, Agent, or Firm* — Barta, Jones & Foley, PLLC

(57) ABSTRACT

A virtual network manager and associated user interface/portal provide customers with simplified centralized management of virtual networks to implement logical groupings of network resources at scale. The virtual network manager enables network segmentation using names or tags, connectivity configuration to create different virtual network topologies, security configuration to provide enforcement of organizational rules without being overwritten and Network Security Group (NSG) management in a simple and scalable manner, safe deployment of network configurations to designated regions on a fix and roll forward basis, and virtual network (VNet) level monitoring.

20 Claims, 39 Drawing Sheets

(51) Int. Cl.
*H04L 41/18* (2022.01)
*H04L 41/0895* (2022.01)
*H04L 41/0893* (2022.01)
*H04L 12/66* (2006.01)
*H04L 9/40* (2022.01)

(52) U.S. Cl.
CPC ...... *H04L 41/0893* (2013.01); *H04L 41/0895* (2022.05); *H04L 41/18* (2013.01); *H04L 63/205* (2013.01)

(56) References Cited

U.S. PATENT DOCUMENTS

| | | | |
|---|---|---|---|
| 11,412,051 B1* | 8/2022 | Chiganmi | H04L 41/0895 |
| 2019/0018965 A1* | 1/2019 | Hoscheit | H04L 63/1408 |
| 2019/0238620 A1* | 8/2019 | Narayanam | H04L 41/145 |
| 2019/0319847 A1* | 10/2019 | Nahar | G06F 9/45558 |
| 2020/0244766 A1 | 7/2020 | Farkas et al. | |
| 2020/0274852 A1* | 8/2020 | Ahmed | H04L 63/0227 |
| 2021/0314235 A1 | 10/2021 | Chandrashekhar et al. | |
| 2022/0103598 A1* | 3/2022 | Vaidya | H04L 49/70 |
| 2022/0417060 A1* | 12/2022 | Sundararajan | H04L 12/46 |

OTHER PUBLICATIONS

Granat, et al., "Management System of the IPv6 QoS Parallel Internet", In Proceedings of 8th International Symposium on Communication Systems, Networks & Digital Signal Processing, Jul. 18, 2012, 6 Pages.

"International Search Report and Written Opinion Issued in PCT Application No. PCT/US22/046137", dated Jan. 23, 2023, 13 Pages.

* cited by examiner

FIG 5
500

| To do | Need to do |
|---|---|
| Un-deploy connectivity configuration deployment | Deploy "none" connectivity configuration to all regions |
| Un-deploy security admin configuration deployment | Deploy "none" security configuration to all regions |
| Delete a security admin rule | 1. Un-deploy the security admin configuration deployment<br>2. Delete security admin rules associated with this security configuration |
| Delete a security rule collection | 1. Un-deploy the security admin configuration deployment using the rule collection you wish to delete<br>2. Delete security admin rules associated with this security rule collection<br>3. Delete the rule collection |
| Delete a security admin configuration | 1. Un-deploy the security configuration deployment<br>2. Delete security rules associated with this security configuration<br>3. Delete the rule collection<br>4. Delete the security admin configuration |
| Delete a connectivity configuration | 1. Un-deploy the connectivity configuration deployment<br>2. Delete the connectivity configuration |
| Delete a network group | 1. Delete the connectivity configuration associated with this network group<br>2. Delete "security rules" associated with this network group<br>3. Delete the network group |
| Delete an AVNM | 1. Delete all configurations (see configuration delete)<br>2. Delete all network groups<br>3. Delete the AVNM |

700

Home >
Activity log ⚡ ⋯

∨ Activity ▪▪ Edit columns ⟳ Refresh ⚙ Diagnostics settings ↓ Download as CSV ⊘ Logs | ⟷ Pin current filters ⊠ Reset filters

| 🔍 Search |

✦ Quick insights

| Management Group : None | Subscription : Azure VNET PM | Event Severity : All | Ti... : Tue Aug 17 2021 12:35:33 GMT-0700 (Pacific Daylight Ti... | +▽ Add Filter |

2 Items,

| Operation name | Status | Time | Time stamp | Subscription |
| --- | --- | --- | --- | --- |
| ⊕ Write NetworkManagers | Succeeded | 18 hours ago | Tue Aug 17 2021 12:41:29 GMT-0700 (Pacific Daylight... | Azure VNET PM |
| > ⊕ Write NetworkGroups | Succeeded | 19 hours ago | Tue Aug 17 2021 12:38:51 GMT-0700 (Pacific Daylight... | Azure VNET PM |

*FIG. 7*

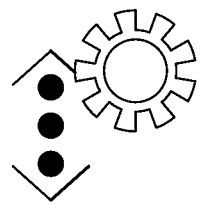
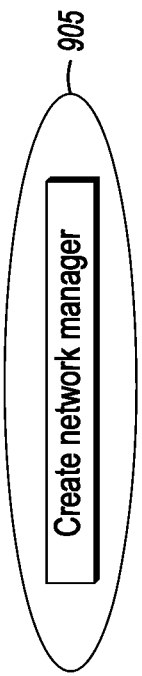
FIG. 9

1000

Create an Azure Network Manager Resource ···

Azure Network Manager | PREVIEW

Basics   Tags   Review + create

Create an Azure Network Manager to create and reply configurations across your network environments.

Project details

Select the subscription to manage deployed resources and cost. Use resource groups like folders to organize and manage all your resources.

| | |
|---|---|
| Subscription * | Azure VNET PM ▾ |
| └── Resource group * ⓘ | (New) testPilot ▾ |
| | Create new |

Instance details

| | |
|---|---|
| Name * ⓘ | PreviewANM ▾ |
| Region * ⓘ | (US) West Central US ▾ |
| Description | My test ANM |

Scope and Features

Azure Network Manager lets you create groups of networks within the scope you define below, and apply configurations based on the features you select. The selected features can be managed by one instance of Azure Network Manager, or by separate instances, However, multiple instances can't overlap on one selected scope. For example, two instances of Azure Network Manager can't manage security for the same management group.

| | |
|---|---|
| Scope * ⓘ | Azure VNET PM ▾ |
| | Select scopes |
| Features * ⓘ | 2 selected ▾ |
| | ☑ Select all |
| | ☑ Connectivity |
| | ☑ SecurityAdmin |

Edit network group
Azure Network Manager | PREVIEW

Basics    Static group members    Conditional statements    Review + create

In this tab you can select and add virtual networks to this group manually.

+ Add virtual networks  |  🗑 Remove virtual networks

Search

| Subscription : All | Resource group : All | Region : All | | |
|---|---|---|---|---|
| ☐ Name | subscription | Resource group | Region |
| ☐ ‹•••› vnet1 | | testcanary | eastus2euap |
| ☐ ‹•••› vnet2 | | testcanary | eastus2euap |

*FIG. 12*

Basics    Static group members    Conditional statements    Review + create

Virtual networks which match the following conditions will be added automatically. Matching virtual networks will appear in the virtual networks tab after you save.

Conditional statements

[>_] Basic editor                ⚡ Evaluate — 1405

```
1  {
2      "allof" : [
3          {
4              "field" : "Name",
5              "contains" : "ANMDemo-Spoke"
6          }
7      ]
8  }
```

1400

Effective Virtual Networks
PREVIEW

Vnets that match the given conditional membership query

| Name | Subscription | Resource group | Region |
|---|---|---|---|
| ‹··› ANMDemo-Spoke-1 | 56a332c0-57e2-46a2-a204-2d8... | testcanary | eastus2euap |
| ‹··› ANMDemo-Spoke-2 | 56a332c0-57e2-46a2-a204-2d8... | testcanary | eastus2euap |
| ‹··› ANMDemo-Spoke-3 | 56a332c0-57e2-46a2-a204-2d8... | testcanary | eastus2euap |

Home > Network managers > Create an azure network managers resource > PreviewANM >

Add a security admin configuration
Azure Network Manager | PREVIEW

Security configurations are a set of rules that you apply to one or more network groups. Rules within each rule collection are applied to the network groups specified for the collection. You can add multiple rule collections with different targets.

Name *  [ GlobalSecurityConfig         ∨ ] ← 1705

Description  [ My test global security config ] ← 1705

Rule collections
When you deploy this configuration, the rules you specify in each collection will be applied to their target network groups.

[ + Add a rule collection ] ← 1710  |  🗑 Delete

Name                                                              Target network groups Add a rule collection to get started.

_1900_

Home > Network managers > Create an azure network
Add a rule collection ...
Azure Network Manager | PREVIEW Name *

Target network groups *  | testRuleCollection |
| myTestStaticNetworkGroup |

Rules

+ Add a rule  |  🗑 Delete

Rule name  ↑↓  Priority ↑↓  Direc

Add an admin rule to get started.

---

×

Add a rule
Azure Network Manager | PREVIEW                                _1905_

Name *                        | Block80         > |

Description                   | Block port 80   > |

Priority * ⓘ                  | 32              > |

Action * ⓘ                    | Deny            > |

Direction * ⓘ                 | Outbound        > |

Protocol * ⓘ                  | Top             > |

Source type ⓘ                 | IP address      > |

Source IP addresses ⓘ         |                   |

Source port ⓘ                 | IP address      > |

Destination type ⓘ            |                   |

Destination IP addresses ⓘ    |                   |

Destination port ⓘ            | 80              > |

Home > Network managers > Create a
PreviewANM | Deployments
Network Manager | PREVIEW | ⓘ Dir 🔍 Search (Ctrl+/)

✦ Overview
▤ Activity log
🔑 Access control (IAM)

Settings
⇄ Network Groups
⚙ Configurations
◈ Deployments — 2005
⚙ Properties

Automation
⌗ Tasks (preview)

Support + troubleshooting
✉ New Support Request

×

Deploy a configuration
Azure Network Manager | PREVIEW     2010

Select a configuration to deploy. The selected configuration will overwrite any
existing configuration of the same type in target region.

Configuration type *        | SecurityAdmin          > |

Configurations *            | GlobalSecurityConfig   > |

Target regions *            | West Central US        > |

Home > PreviewANM | configurations >
Add a connectivity configuration
Azure Network Manager | PREVIEW Name *
[ MeshExample ]

Description
[ My mesh example ] — 2205

Topology ⓘ
◉ Mesh
○ Hub and Spoke

Network Groups
All virtual network in your selected network groups will be peered with each other.
+ Add network groups  |  🗑 Remove network groups
Network groups Add network groups to apply this configuration
[ Add network groups ]

---

Add network groups
Azure Network Manager | PREVIEW                                    ✕
Select network groups to apply this configuration.

| ✓ | Network Groups | Static Group Members | Dynamic Membership Enabled |
|---|---|---|---|
| ✓ | ⇄ TestVnetsGroup | | Yes |

Home >

Network Managers ✐
Microsoft | PREVIEW

+ Add    ▦ Edit columns  ⟳ Refresh  ⇄ Try preview  ⊘ Assign tags  🗑 Delete

Subscriptions: 21 of 26 selected - Don't see a subscription? Open directory + Subscription settings

| Filter by name... | 21 subscriptions ⌄ | All resource groups ⌄ | All locations ⌄ | All tags ⌄ |

1 items

| ☑ Name ↑↓ | Type ↑↓ | Resource group ↑↓ | Location ↑↓ |
| ☑ ⚙ PreviewANM | Network Manager | testcanary | eastus2euap |

↙ 3205

✕

Delete Resources
Deleting 1 resource

Are you sure you want to delete this Network Manager?

⚠ Warning! This will permanently delete the selected Network Managers. Note, if any of the selected Network Managers have associated child resources, that Network Manager will not be deleted. Do you wish to continue?

Confirm delete ⓘ

| Type 'yes' for confirmation |

Selected resources

⚙ PreviewANM (network manager)

LOGICAL GROUPING OF NETWORK RESOURCES AND CONTROL AT SCALE

BACKGROUND

Cloud computing using virtual networks provides the foundation for digital transformation. Customers who strategically leverage the cloud can capture significant value—value that differentiates them from their competitors with improved time to market and flexibility in managing costs and scale. A key challenge for these customers, however, is supporting effectively and efficiently managed networking across their environments for different types of users, regions, management groups, and subscriptions. For example, as the number of network resources in the customer's networks are scaled up, complexity, overhead, and operational costs can increase exponentially.

SUMMARY

A virtual network manager is instantiated as a software construct on a computing device such as a cloud network server in a datacenter and is configured to enable cloud computing customers to simplify and scale operation and control of their cloud-based networks. The computing device supports a virtual network manager portal that provides a user interface that is arranged to enable a customer's information technology (IT) administrative personnel to create one or more instances of virtual network managers to provide for central management and control of the customer's network resources and connectivity, security, and routing policies globally across different regions, management groups (including groups across tenants), and subscriptions. The virtual network manager may also be configured such that its functionalities may be accessed through other interfaces such as a command line interpreter, PowerShell, SDK (software development kit) tools, or the like.

Groups of virtual networks (VNets) and/or subnets can be defined, statically or dynamically, by name or a tag through the network manager portal based on, for example, service/subscription, tenant, organization, function, and/or environment across different regions and subscriptions. For example, a database team and finance team can be in different groups, and development, production, and test environments can be in different groups. Administrators can individually define a scope for each virtual network manager, subscription, and management group, etc. that is under management by the virtual network manager. The virtual network manager further enables administrators to segment network resources by applying security, connectivity, and routing configurations to the defined groups and then monitor deployment status from the centralized portal. For dynamically-constituted groups, virtual network configurations can be automatically updated as the groups change to maintain a specified state.

The virtual network manager is adapted to interface and control functionalities operating on the computing infrastructure that underlies a customer's cloud networks to simplify network connectivity configuration. Hub and spoke topologies in which spokes can communicate with each other can be defined through the network manager portal. The underlying network infrastructure will be responsively adapted by the virtual network manager without the administrator needing to explicitly establish spoke peering or dealing with peering limits and similar implementation details. Instead, the administrator may define the hub and spoke groups through the portal at a high level and the necessary mesh to enable traffic to flow among the spokes is built on the infrastructure and managed by the network manager without further customer interaction.

In scenarios in which a customer may use a middlebox to connect their VNets (i.e., a network service function or service interposition appliance that implements tunnel endpoint functionality), a Network Virtualization Authority (NVA) typically may limit bandwidth among the spokes. The virtual network manager can operate to build meshes that use native network peering to avoid such limitations.

The virtual network manager may be further adapted to enable administrators to define global security rules through the portal that are applicable to all the resources that fall within the network manager's scope. Different rules can be defined for different groups within their defined scope. The global rules can prevail over rules defined by a network resource owner for particular Network Security Groups (NSGs) that typically operate to govern (e.g., allow or deny) inbound network traffic to, and outbound traffic from, the network resources. For example, an administrator may implement a global rule using the virtual network manager to deny all high-risk ports and/or protocols coming from the Internet, and the relevant resource owners cannot override such global rule.

The virtual network manager is further configured to enable safe deployment features in which changes to the virtual network may be rolled out using a customer-specified sequence and frequency. Network topology visualization may also be supported by the virtual network manager through the portal to enable customers to view their network topology end to end while enabling flow-logging between any given source and destination in the network.

Advantageously, the virtual network manager acts to improve cloud-based network operations and security by reducing the complexity that is ordinarily associated with the operations of virtual networks, particularly those that comprise a large number of VNets that may be spread across multiple regions using complex network topologies. By supporting streamlined and centralized visibility and control of virtual network elements and resources through the portal, the present virtual network manager facilitates control at any scale, rapid configuration troubleshooting, and effective enforcement of applicable security policies. Opportunities for rules conflicts and network configuration errors are minimized using the centralized approach enabled by the virtual network manager which further improves the technical operation of the underlying computer infrastructure of a customer's virtual network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 5 is an illustrative table that shows ways to delete various components of a virtual network manager;

FIG. 7 shows an illustrative UI for an activity log of a virtual network manager;

FIG. 9 shows an illustrative control on a UI for initiating creation of a virtual network manager;

FIG. 10 shows an illustrative UI for creating a virtual network manager;

FIG. 12 shows an illustrative UI for adding virtual networks (VNets) as static members of a network group;

FIG. 15 shows an illustrative UI that displays VNets that meet specified conditions;

FIG. 17 shows an illustrative UI for adding a name and description to create security administration configuration and adding a rule collection;

FIG. 19 shows an illustrative UI for specifying security rules;

FIG. 20 shows an illustrative UI for committing a security configuration;

FIG. 22 shows an illustrative UI for adding a name and type of topology for a connectivity configuration;

FIG. 23 shows an illustrative UI for committing a connectivity configuration;

FIG. 31 shows an illustrative UI for deleting a network group;

FIG. 32 shows an illustrative UI for deleting a virtual network manager;

Like reference numerals indicate like elements in the drawings. Elements are not drawn to scale unless otherwise indicated.

DETAILED DESCRIPTION

Figure 1:
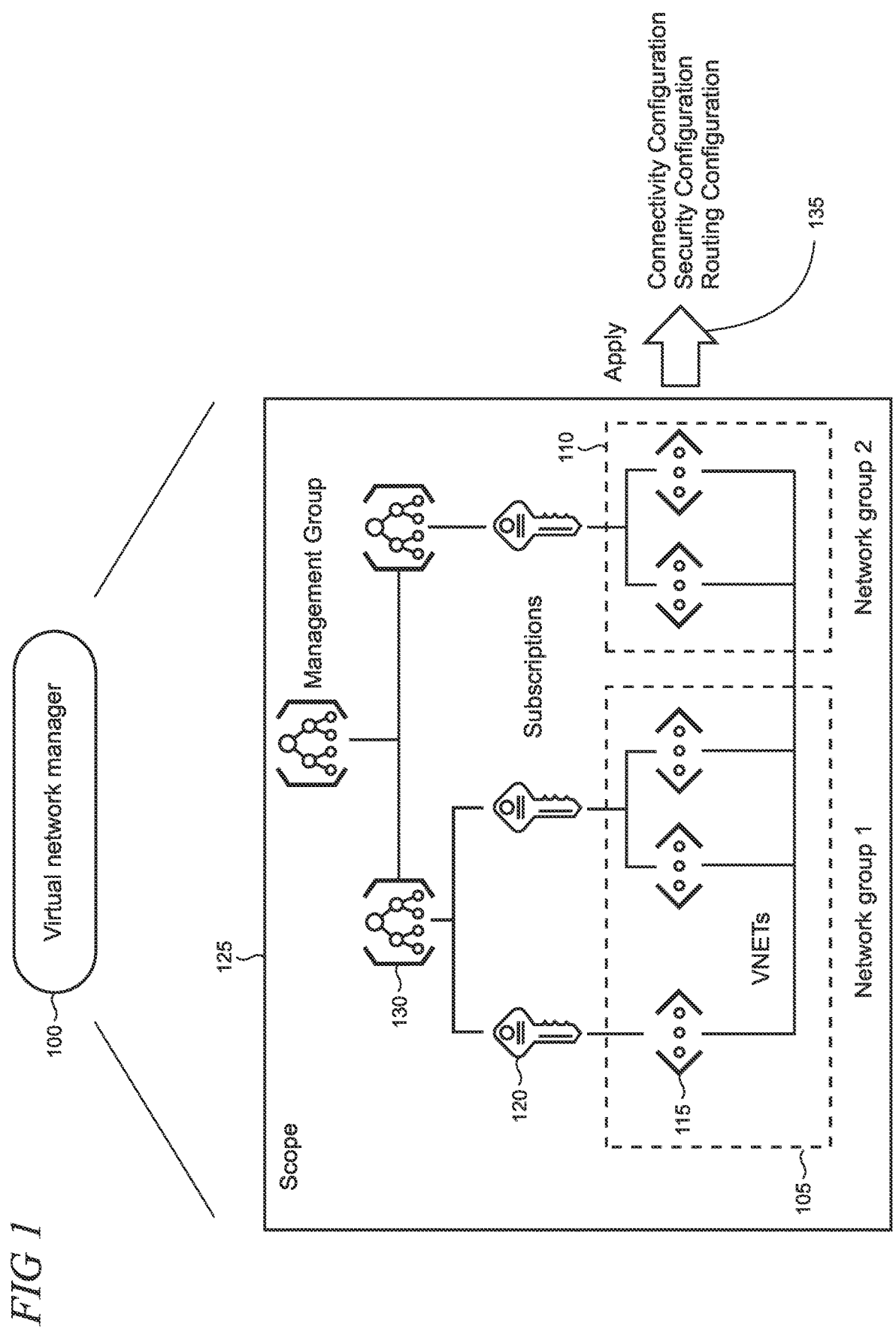
FIG. 1 shows exemplary network groups under management by a virtual network manager.

FIG. 1 is an illustrative diagram that shows exemplary network groups 105 and 110 under management of a virtual network manager 100. The network groups are defined by selection of particular virtual networks (VNets), representatively indicated by reference numeral 115. The network groups can be defined across subscriptions 120 and regions (not shown). IT administrators can define a scope 125 for the virtual network manager, which includes subscriptions and management groups 130 that are managed by the virtual network manager. Connectivity, security, and routing configurations may be applied to the network groups, as indicated by the arrow 135.

Figure 2:
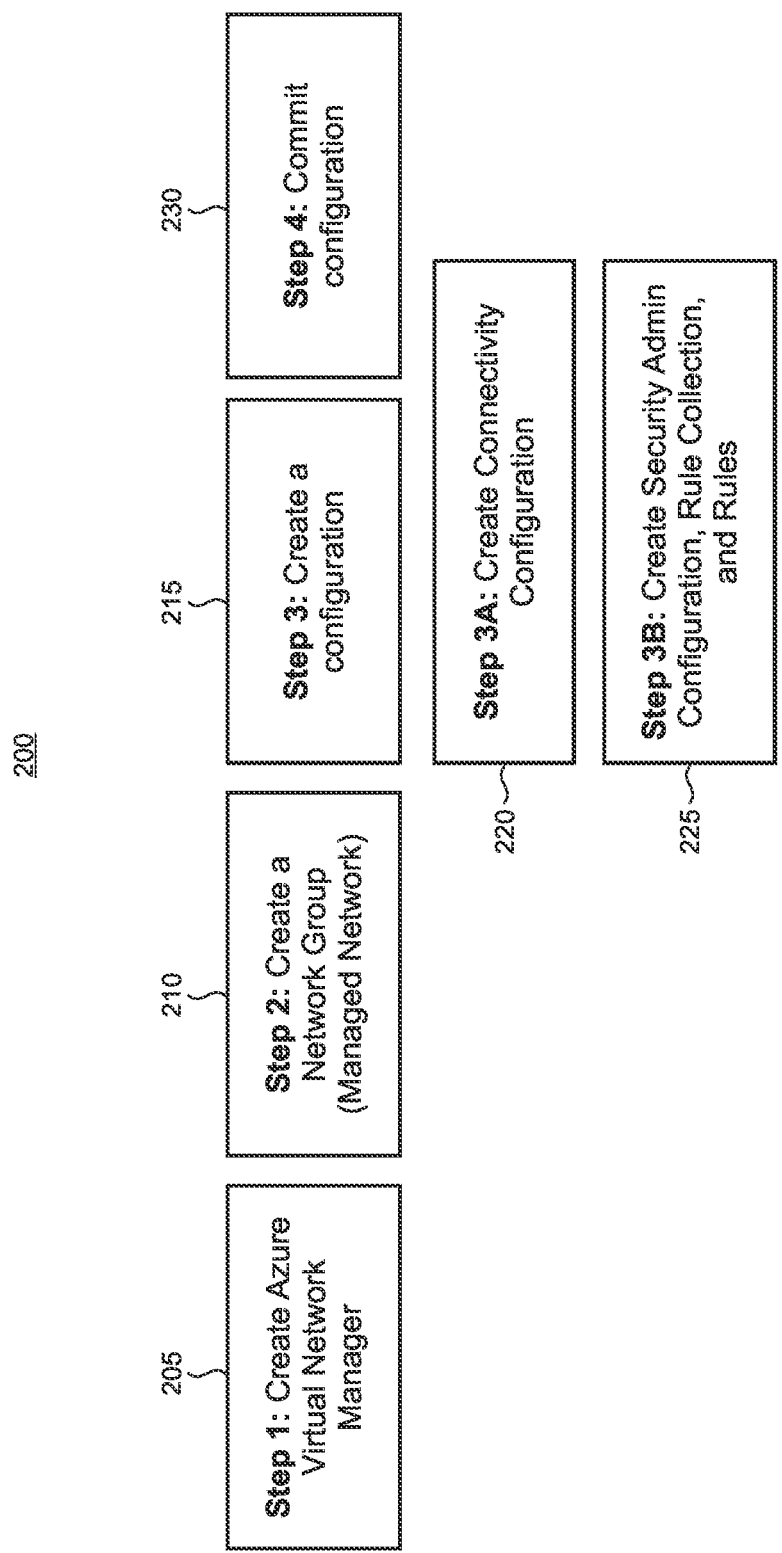
FIG. 2 shows an illustrative workflow for a virtual network manager.

FIG. 2 shows an illustrative workflow 200 of a virtual network manager 100 (FIG. 1) for two illustrative management features including connectivity and security administration configuration. In step 205, a virtual network manager is created which is the top-level object (i.e., software construct) and includes other child resources of the virtual network manager, networks groups, configurations, and rules. The scope of the virtual network manager is the range of resources where any feature can be applied. This value can contain both subscriptions and management groups. Note that if a management group is selected as a scope, all the children are included. Also, multiple instances of virtual network managers cannot be created with an overlapping scope at the same hierarchy.

Multiple instances of a virtual network manager may be created to manage network resources in a hierarchy. A hierarchy means that multiple virtual network managers managing overlapping scopes, and the configurations of such virtual network managers, can be overlayed. For example, a top-level management group can fall within the scope of a virtual network manager, and a child management group may be selected as the scope of another virtual network manager. The effects of the virtual network managers in a hierarchy can be overlayed. When there is a conflict between configurations from different virtual network managers, the configuration from the virtual network manager with a higher level scope will prevail. The scope access is a list of features that the Network Manager can apply. In this illustrative example, a virtual network manager has a feature scope of connectivity, security administration, or both. In some cases, if a virtual network manager has only the connectivity scope access feature, a user can be blocked from applying any security features, and vice versa.

In step 210, a network group is created to define a managed network. Creation of a network group allows users (e.g., an IT administrator or other authorized personnel associated with a given virtual network customer) to define a subset of the overall scope to apply specific security administration or connectivity policies. Users can use the defined subset to specify to which VNets the policies are applied in two ways—VNets in the group can be explicitly listed or conditionally selected in the overall scope. For example, users can create a conditional group of all VNets with tag 'red' in such group. A network group can be dynamic such that when users specify conditions in which VNets belong to the network group, the virtual network manager adds or removes the VNets based on the specified conditions and applies the deployed configurations accordingly. Users-specified configurations are referred to as the goal state, and the virtual network manager may make changes to meet the goal state automatically.

It is noted that a given VNet can be associated with multiple different virtual network managers. In addition, VNets associated with other subscriptions not controlled by a given user can be added to a network group with suitable permissions.

In step 215, a configuration is created in the virtual network management workflow. In this illustrative example, the configuration step includes two sub-steps. In sub-step 220, a connectivity configuration is created, and in sub-step 225, a security administration configuration is created which contains a set of rule collections. Each rule collection consists of security administration rules, and users can associate rule collections with network groups to which they want to apply the security administration rules. Security administration rules are organization level (i.e., global) security rules that are applicable to all resources (e.g., virtual machines) created in VNets that are managed by a virtual network manager.

A direction option enables users to specify the direction of traffic to which this rule applies. The option is either inbound or outbound. The protocols supported include TCP (Transport Control Protocol), UDP (User Datagram Protocol), ICMP (Internet Control Message Protocol), ESP (Encapsulating Security Payload), AH (Authentication Header), and other suitable protocols as may be needed to support a particular implementation of the present principles. Source and destination type may also be specified by a user including, for example, an IP (Internet Protocol) address and/or a service tag.

Figure 3:
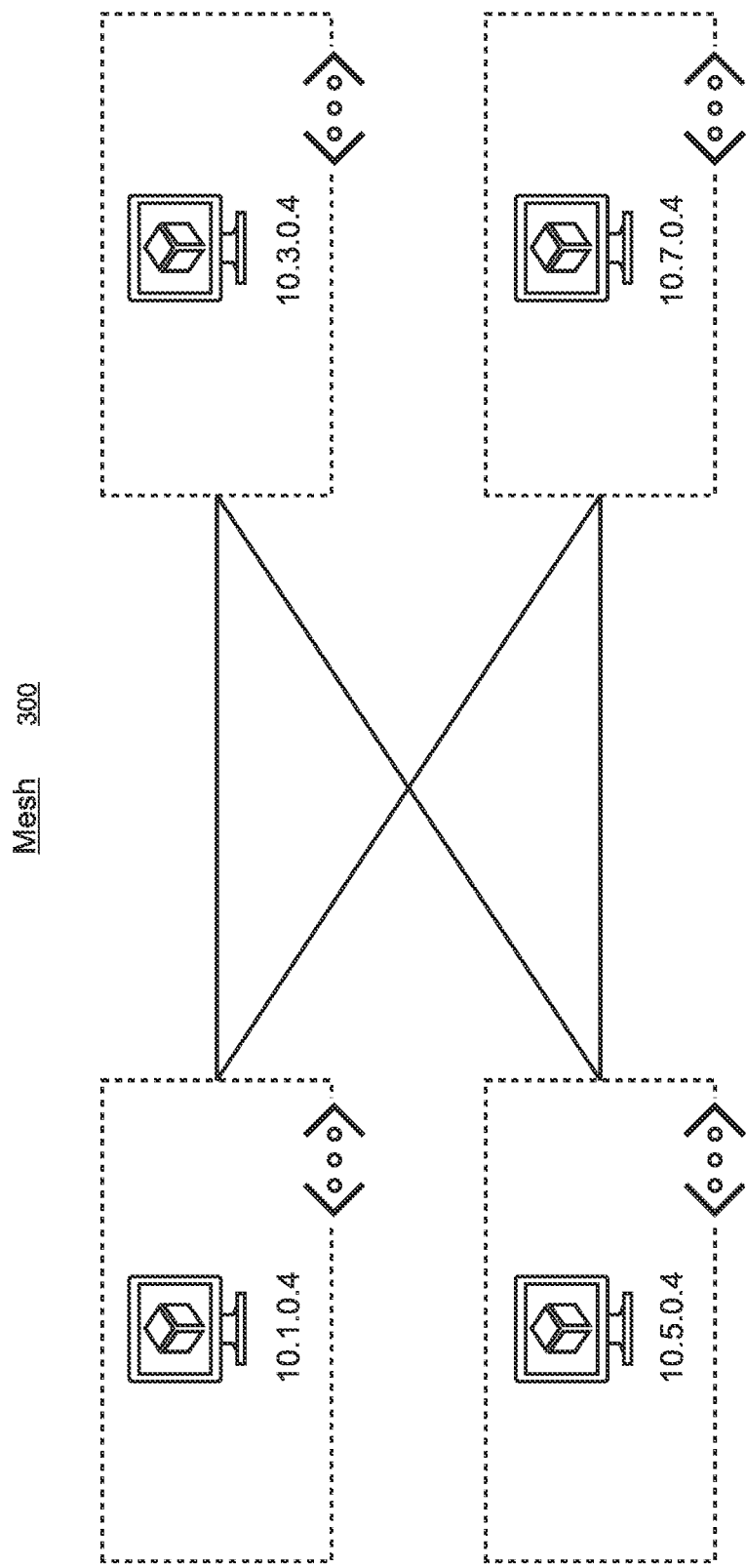
FIG. 3 shows an illustrative mesh network topology.
Figure 4:
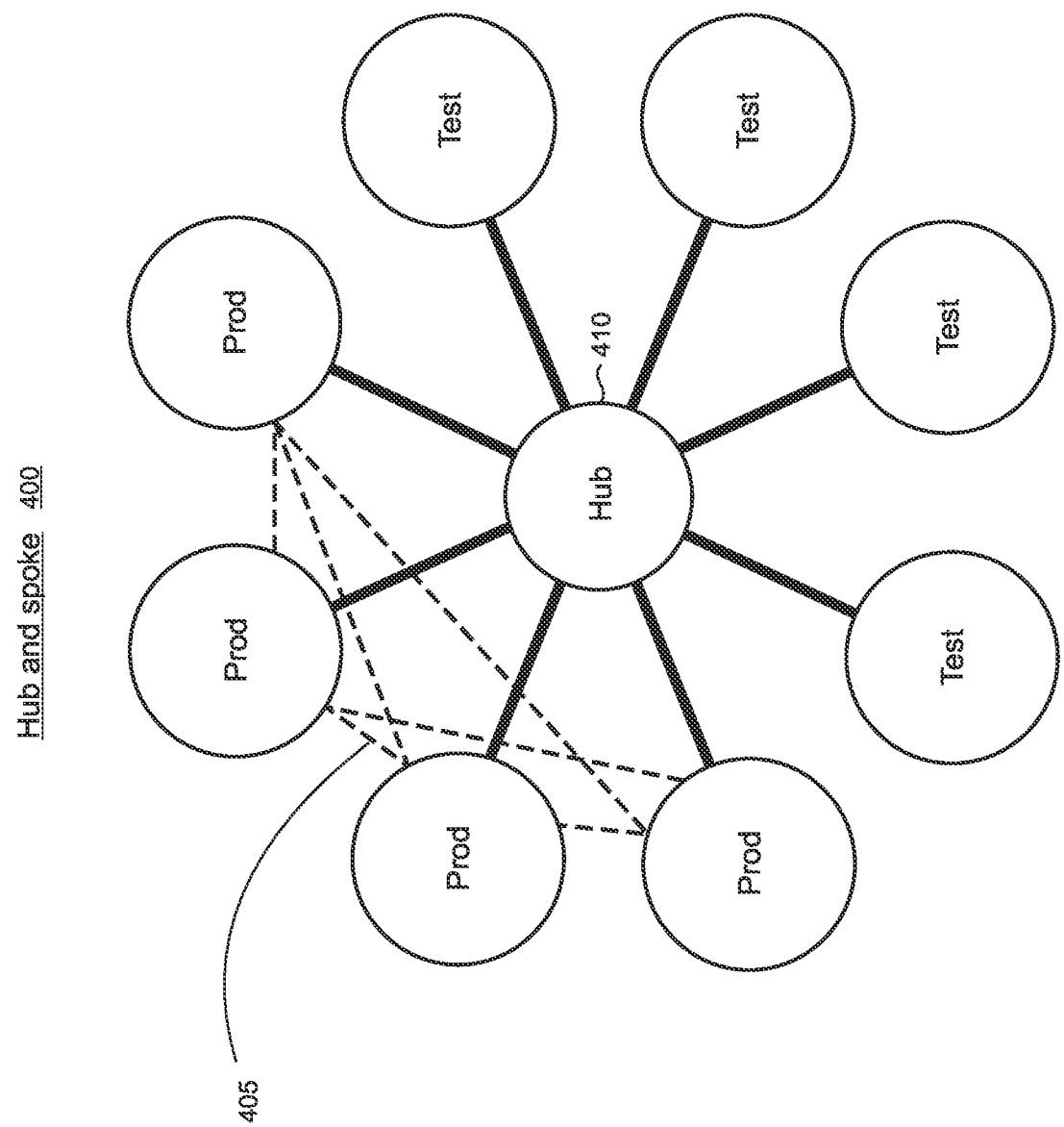
FIG. 4 shows an illustrative hub and spoke network topology.

In sub-step 220, a connectivity configuration is created in which users may define different network topologies and connections, such as a mesh topology 300 shown in FIG. 3 and a hub and spoke topology 400 shown in FIG. 4. The connectivity flow is entirely defined in the connectivity configuration.

As shown in FIG. 3, a mesh network 300 comprises a topology in which all virtual networks are connected to each other. In this context, all VNets within the applied group are bidirectionally-peered. It is noted that if the subnets of VNets have the same address space, they cannot still talk to each other even if they are part of the same mesh. In an illustrative example, a VNet can be part of up to five mesh configurations.

With the hub and spoke network topology 400 shown in FIG. 4, users choose a VNet to act as the hub VNet, which is bidirectionally-peered to every spoke VNet as defined by the VNets in the applied group. This arrangement may be considered the base hub and spoke topology, however extra options may be provided. With a transitivity option, users can choose whether to bidirectionally peer each spoke member to one another on top of the base hub and spoke topology. It is noted that the spoke-to-spoke peering generated with the transitivity option only applies to VNets within the same network group (e.g., a "production" group where the peering is indicated by dashed line 405). In this example, a user can create two network groups: production VNets and the hub 410, and test VNets and the hub. A user can apply a hub and spoke connectivity with transitivity configuration to the production VNets. The user can also separately apply a hub and spoke connectivity without transitivity configuration to the other network group.

A second option comprises using the hub 410 as a gateway. Here, users can set up the hub as a gateway, which can be peered to a private cloud on top of the base topology.

Referring again to FIG. 2, in sub-step 225, security administration rules allow users to enforce security criteria. Users can define security rules that are applied to network resources that are created in the scope. The security rules can allow users to overwrite a Network Security Group (NSG) setting defined by the resource owner. For example, an administrator can deny all high-risk ports/protocols coming from the internet using a security rule regardless of the Network Security Group settings created by the resource owners. A security administration configuration may be utilized to supplement or replace NSG schemes in some applications where NSGs alone may be limited. For example, NSGs do not solve the use cases for the customers who want a restrictive allow option. The deny rule in an NSG always breaks existing connectivity for customers. Thus, if an NSG is attempted to be added to every subnet in every VNet, exceptions must be handled on all these subnets and VNets because, by default, the NSG will block all. For example, a user may want to block high-risk ports and port 22/80 from the Internet and let all other ports be as they are. They can add these rules to NSGs. However, the deny rule at the end will also block all other ports.

Users can specify the following options in a security rule—priority, action, direction, and protocol. Priority comprises an integer between 0 and 99 giving the tiebreaker for conflicting rules. The lesser the priority number, the higher the priority of the rule. For example, a deny rule of priority 89 overwrites an allow rule of priority 90. Action comprises a security rule that has three actions—1) Allow—Allow traffic on the specified port, protocol, and source/destination IP prefixes in the specified direction; 2) Deny—Block traffic on the specified port, protocol, and source/destination IP prefixes in the specified direction; and 3) Always allow—Regardless of other rules with lower priority and user-defined NSGs, allow traffic on the specified port, protocol, and source/destination IP prefixes in the specified direction.

In step 230 of FIG. 2, users need to commit the deployment to apply the configurations. Creating or changing network managers, network groups, connectivity, and security administration configurations (including security administration rules) will not take effect unless the deployment is committed. When committing the configuration, users choose where they want to deploy the configuration. Once the deployment request is sent to the virtual network manager, it will calculate the goal state (discussed in more detail below) of the network resources and request the underlying infrastructure to make the suitable changes.

After a configuration is deployed, the ways to update the deployment are different for static and dynamic membership of VNets in a given network group. As described below, the virtual network manager uses a goal state model for conditional VNet members. In this model, the virtual network manager dynamically adjusts to meet the requirements in the deployed configuration if there is dynamic membership in the network group. With this feature, the configuration does not need to be deployed again. On the other hand, a static membership is specified for VNets in the network group; a deployment must be committed to enable the configuration to be applied again on the network group when changes in the static membership occur. For example, if a VNet is added to the static membership in the network group, deployment must be committed again to take effect.

When a deployment is committed, an application programming interface (API) performs a Post operation, and completion of the deployment will not be seen until after calling the commit API. After the deployment request is made, the virtual network manager will calculate a goal state of a network and request the underlying infrastructure to make the changes (which make take a few minutes). The deployment status may be viewed by calling a suitable deployment status API or by using a deployment user interface (UI) in the virtual network management portal.

With the goal state model, when the configurations are committed, the user describes the goal state of configurations that are desired to be created. For example, when configuration 1 and configuration 2 are committed into a region, these two configurations are applied. Next, when configuration 1 and configuration 3 are committed, configuration 2 is removed, and configuration 3 is added in the region. Similarly, if all the configurations are sought be removed, "no configuration" can be committed to specify that no configurations are desired in that region. The virtual network manager automatically applies the configuration whenever changes are made. For example, when a user creates a VNet previously not in the network group when a configuration is deployed, the virtual network manager evaluates whether this VNet should be in the network group. If the conditions are met, the VNet will be added to the network group, and the configuration will be applied automatically.

Figure 31:
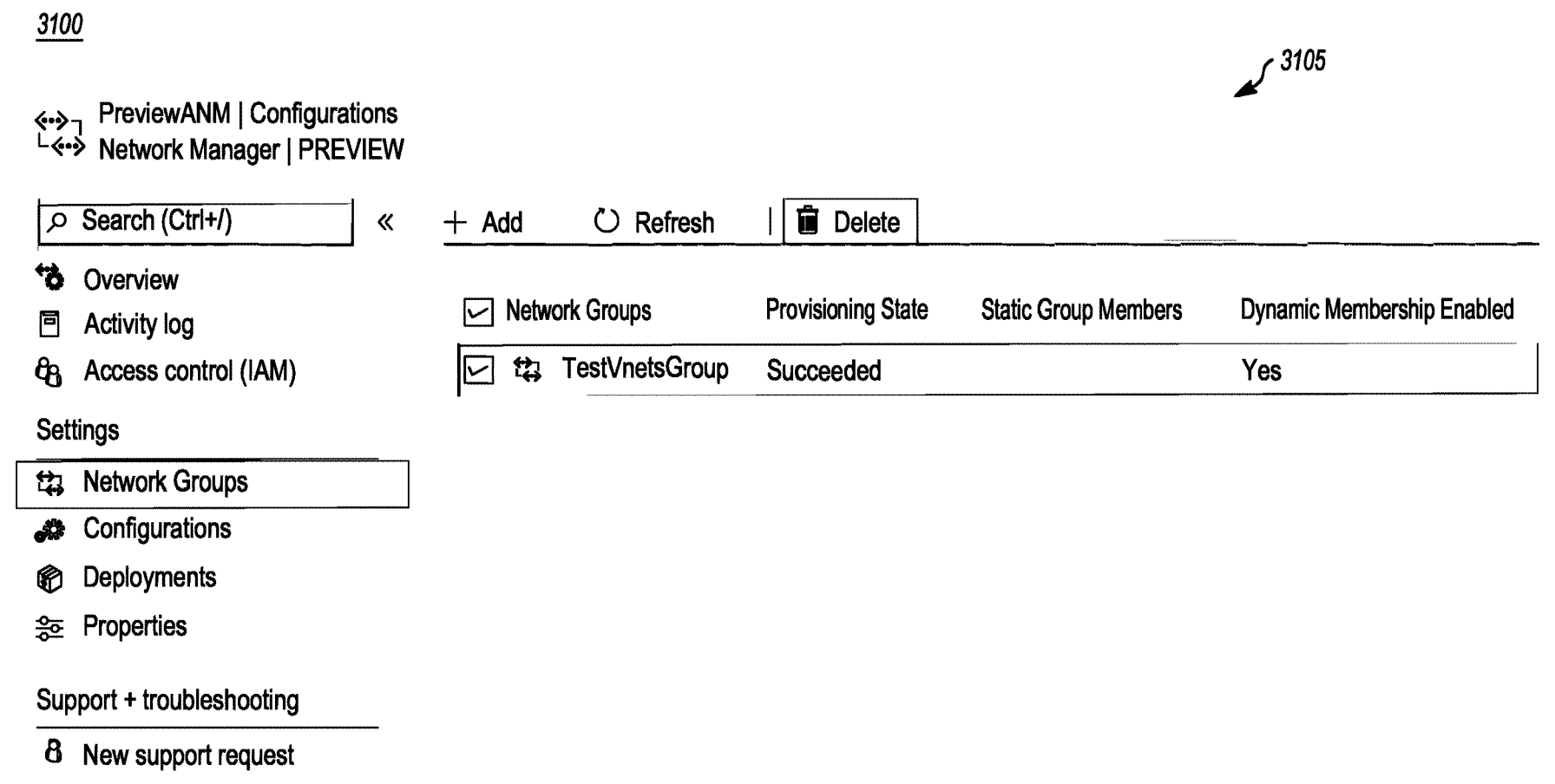

FIG. 5 is an illustrative table 500 that shows ways to delete various components of a virtual network manager. When deleting a virtual network manager component, components are un-deployed/removed using the component that is to be deleted. For example, to delete a connectivity configuration, it is first un-deployed. A connectivity configuration would need to be re-deployed to use the updated configuration. To delete a virtual network manager, all its deployments need to be un-deployed, and security rules, configurations, and network groups deleted. An example UI and workflow exposed by the virtual network manager portal for deleting a virtual network manager is shown in FIGS. 31 and 32 and described in the accompanying text below.

Figure 6:
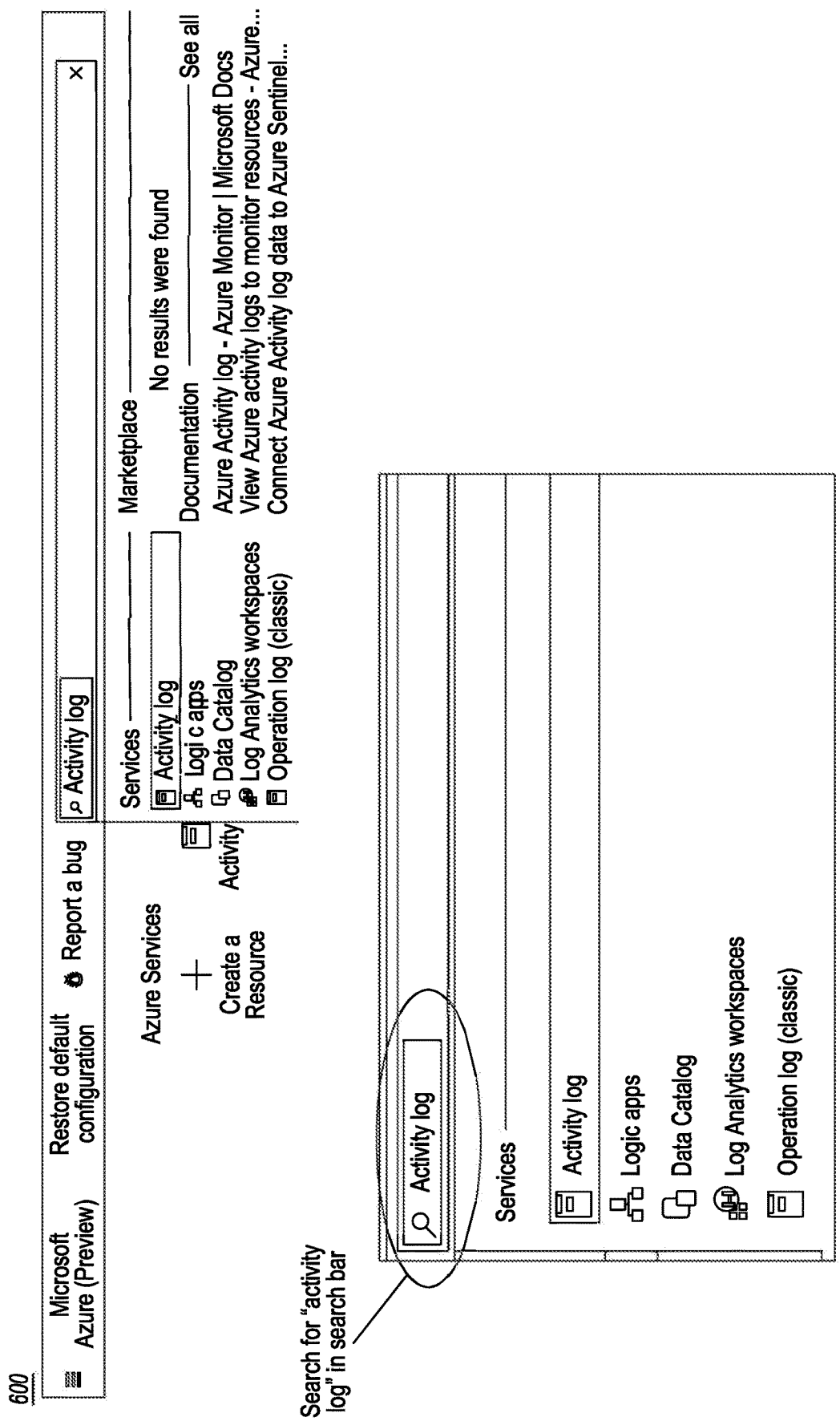
FIG. 6 shows an illustrative user interface (UI) supporting a search feature on the virtual network manager portal.

Users can see requests made to a virtual network manager via an activity log functionality. To access the activity log, "activity log" may be used in the search bar in the virtual network manager portal as shown in the UI 600 in FIG. 6. An illustrative activity log is shown in the UI 700 in FIG. 7. In some implementations and/or use scenarios, when available, users can also gain visibility to changes implemented by the virtual network manager using other options including, for example: 1) Viewing security administration rules that are applied to virtual machines (VMs) and network interface controllers (NICs) in a VM Portal's networking blade/UI; 2) Seeing security administration rules in Network Watcher Effective security rules; 3) Viewing applied security administration rules for specific traffic in a Network Watcher IP flow verify feature; 4) Viewing security administration rules using a NIC blade/UI; 5) Viewing a virtual network manager configuration in a VNet blade/UI. It is noted that the term "blade" may refer to a configuration page or the like that is viewable as a UI element in some computing systems.

The virtual network manager may be used through a network manager portal in some use scenarios. Access to an illustrative portal is now described in a series of steps. In step 1, a user may access a portal that is exposed by a computing device such as a server that supports the virtual network manager. In some cases, appropriate credentials are required and/or the user must be on a suitable whitelist to use a virtual network manager.

Figure 8:
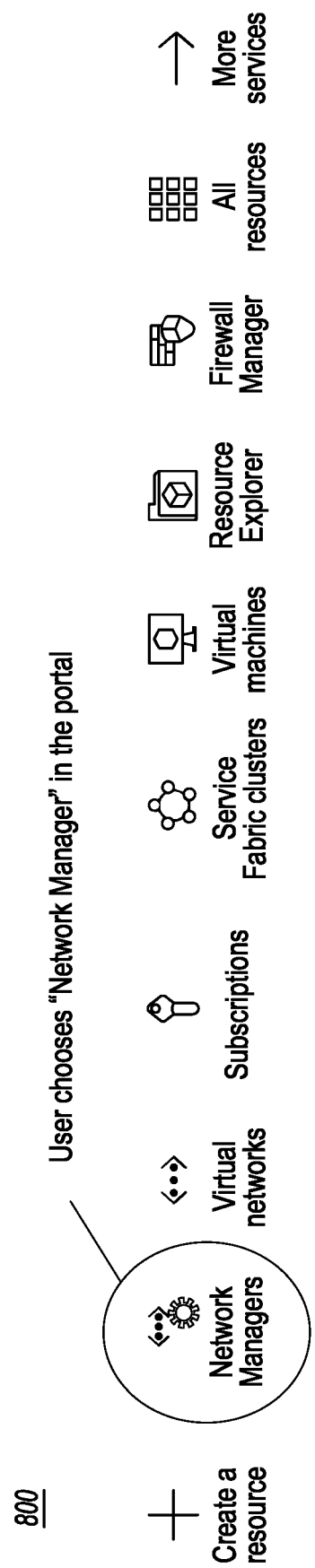
FIG. 8 shows an illustrative UI for selecting a virtual network manager.

In step 2, a virtual network manager is selected through the portal, as shown in the illustrative UI 800 in FIG. 8. In cases in which "Network Managers" does not appear by default in the top bar of the UI, then a user may search for Network Managers in the search bar shown in the UI 600 in FIG. 6.

Figure 11:
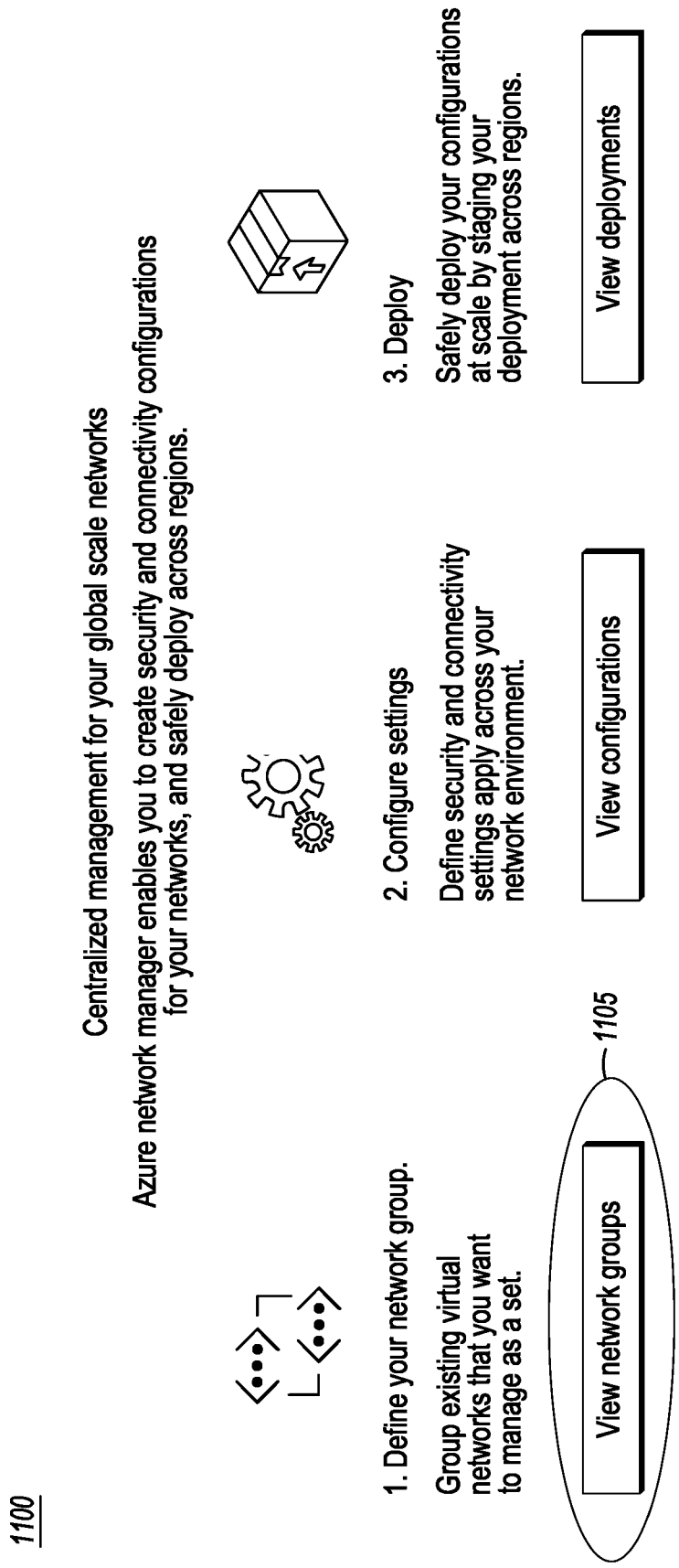
FIG. 11 shows an illustrative UI for creating a network group with a condition in which network groups may be viewed.
Figure 13:
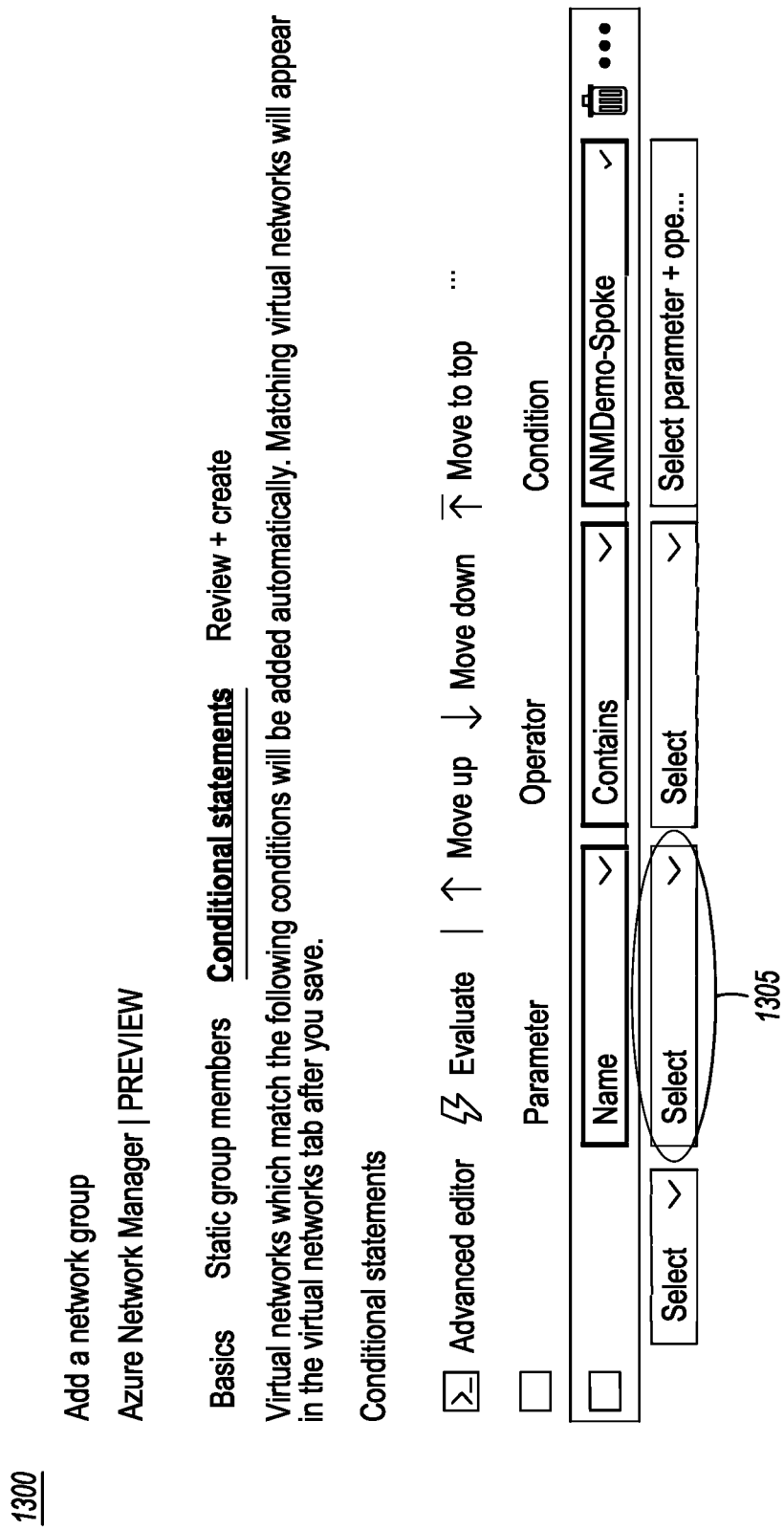
FIG. 13 shows an illustrative UI for editing conditional membership of VNets in a network group using selectors.
Figure 14:
FIG. 14 shows an illustrative UI for defining conditional membership of VNets in a network group using JSON (JavaScript Object Notation) syntax.

In step 3, a virtual network manager can be created using the control 905 as shown in the illustrative UI 900 in FIG. 9 which launches UI 1000 as illustratively shown in FIG. 10. In step 4, a group with conditions may be created. Here, as shown in the illustrative UI 1100 shown in FIG. 11, a user may select the first option "View network groups" as shown by reference numeral 1105. The user may then add VNets into the network group as static group members by specifying them using the illustrative UI 1200 in FIG. 12. Conditional membership of group members can be specified using selectors (representatively indicated by reference numeral 1305), as illustratively shown by the UI 1300 in FIG. 13. Conditional membership can also be specified using an "Advance Editor" and JSON (JavaScript Object Notation) syntax, as shown in the illustrative UI 1400 in FIG. 14. To see which VNets will have the membership, the "Evaluate" control 1405 can be clicked and a list of the VNets that meet the condition are displayed on the portal, as illustratively shown in the UI 1500 in FIG. 15.

Figure 16:
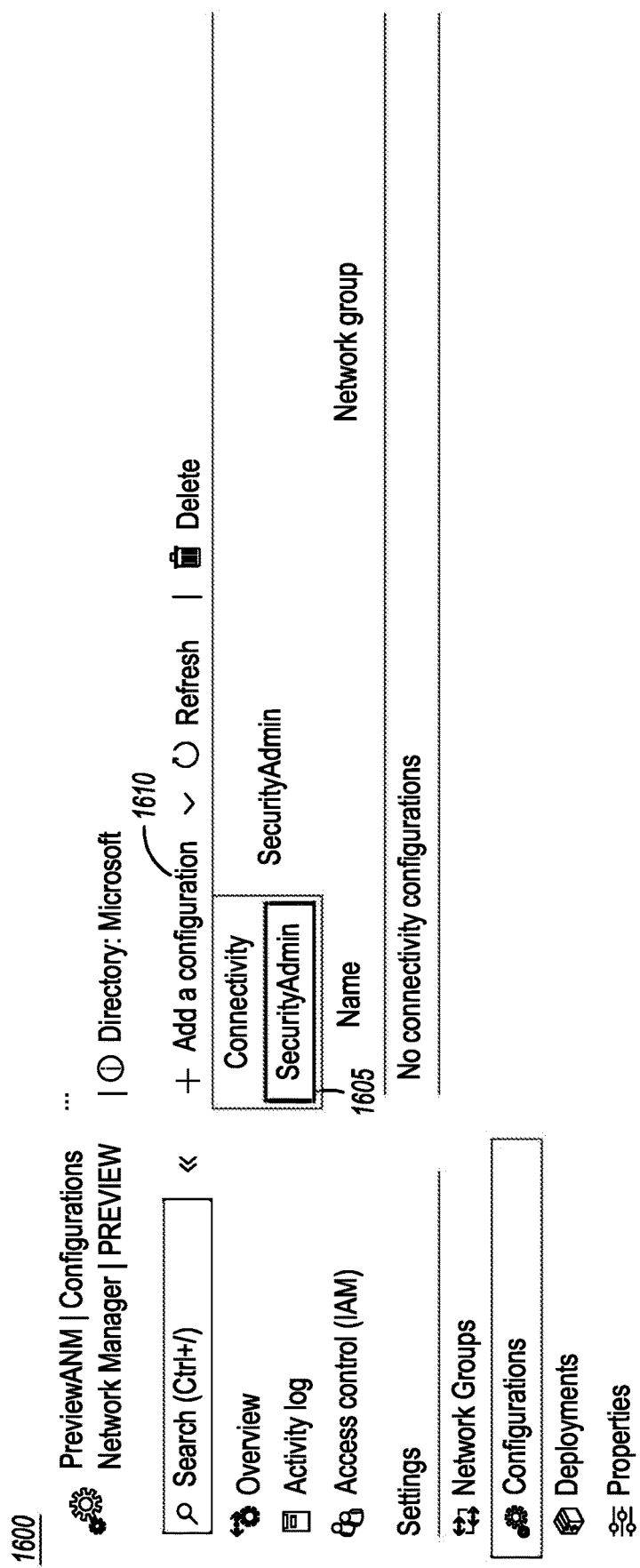
FIG. 16 shows an illustrative UI for creating a security administration configuration and rule collection.

In step 5, a security administration configuration and a rule collection may be created. The user navigates to the "Configurations" page under settings in the portal and selects "SecurityAdmin" as shown in the illustrative UI 1600 in FIG. 16. and indicated by reference numeral 1605. The displayed list will change based on the scope access (i.e., features) that are selected. For example, if the virtual network manager only manages connectivity, then only the "Connectivity option" is available to select under the "Add a configuration" control 1610.

Figure 18:
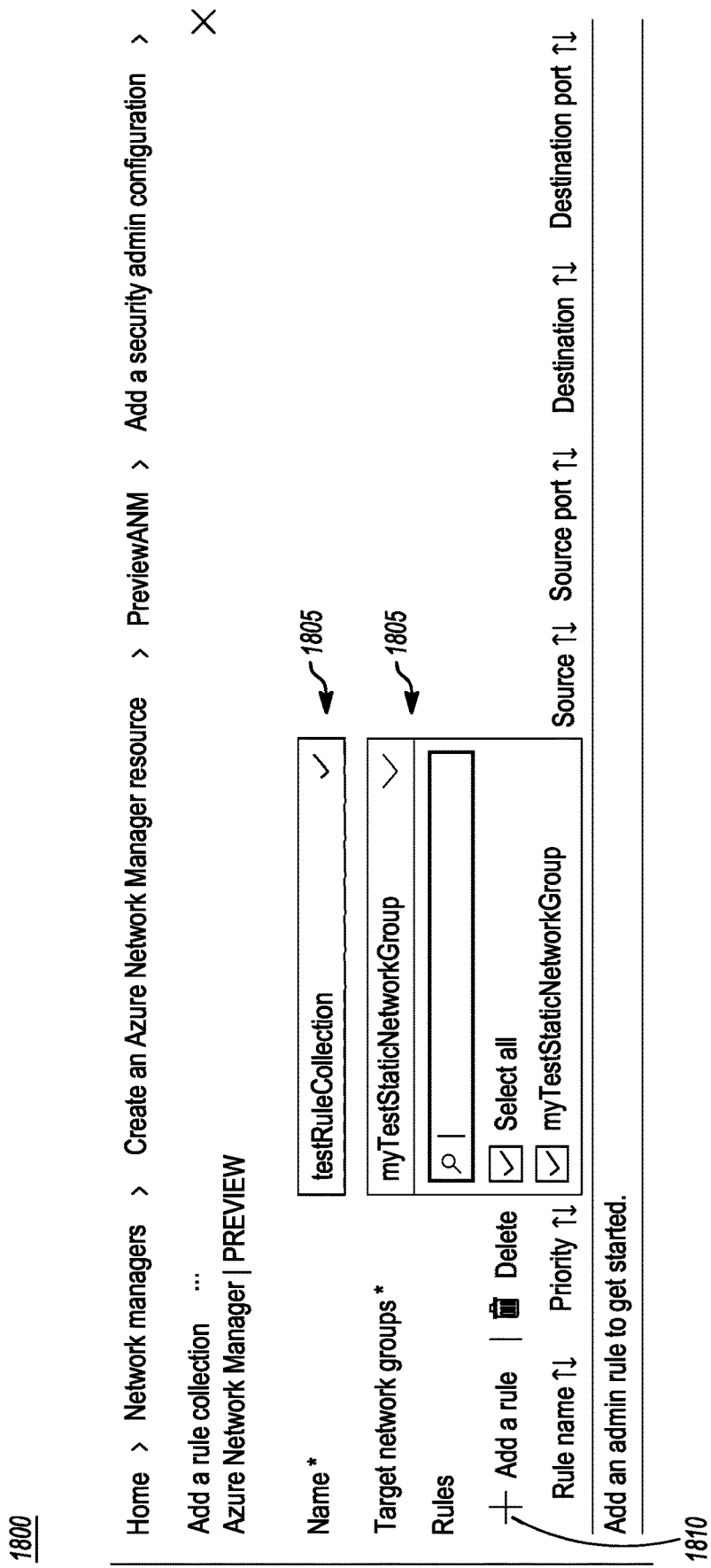
FIG. 18 shows an illustrative UI used for creating security rules.

A name and description may be added to create a security administration configuration, as indicated by reference numeral 1705. The "Add a rule collection" control 1710 in the illustrative UI 1700 may be utilized to add the rule collection in step 5. The illustrative UI 1800 in FIG. 18 is then launched in step 6. The user may interact with UI 1800 to add a name and a target network group, as indicated by reference numeral 1805. Security rules are created by clicking the "Add a rule" control 1810 which launches the illustrative UI 1900 shown in FIG. 19. The rules can be specified in the right-side box 1905.

In step 7, the security configuration is committed. The "Deployment" control 2005 may be clicked in the illustrative UI 2000 in FIG. 20 and a deployment is selected in the right side box 2010. The "SecurityAdmin" configuration, the configuration name, and the target regions are specified to commit the security configuration in this illustrative example.

Figure 21:
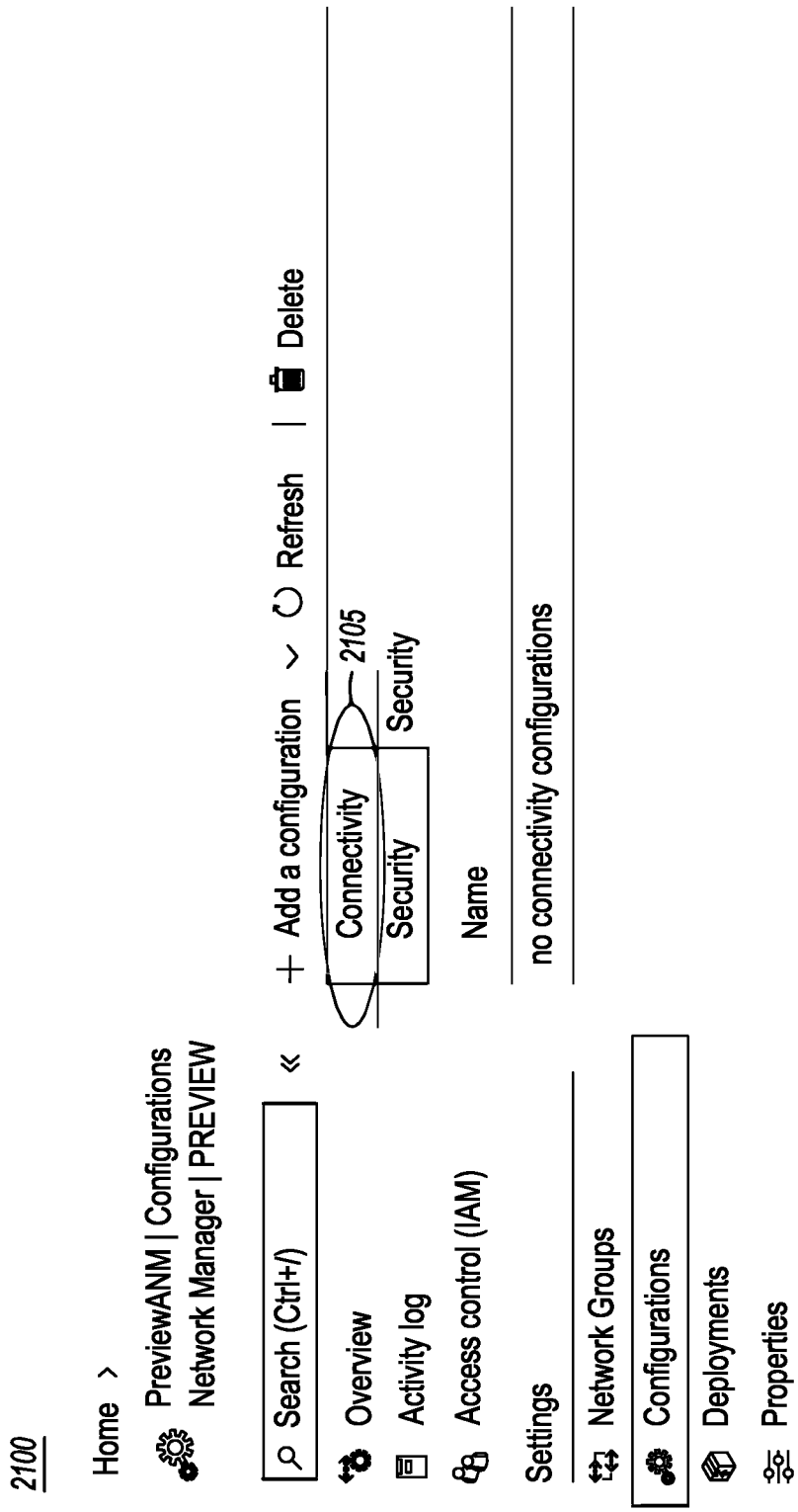
FIG. 21 shows an illustrative UI for creating a connectivity configuration.

In step 8, a connectivity configuration with mesh topology is created in this illustrative workflow. "Connectivity" is selected in the configuration page shown in the illustrative UI 2100 shown in FIG. 21, as indicated by reference numeral 2105. A name and type of topology is added, as indicated by reference numeral 2205, using the illustrative UI 2200 shown in FIG. 22, and the network group is chosen for which application of the connectivity configuration is desired, as indicated by reference numeral 2210.

Figure 23:
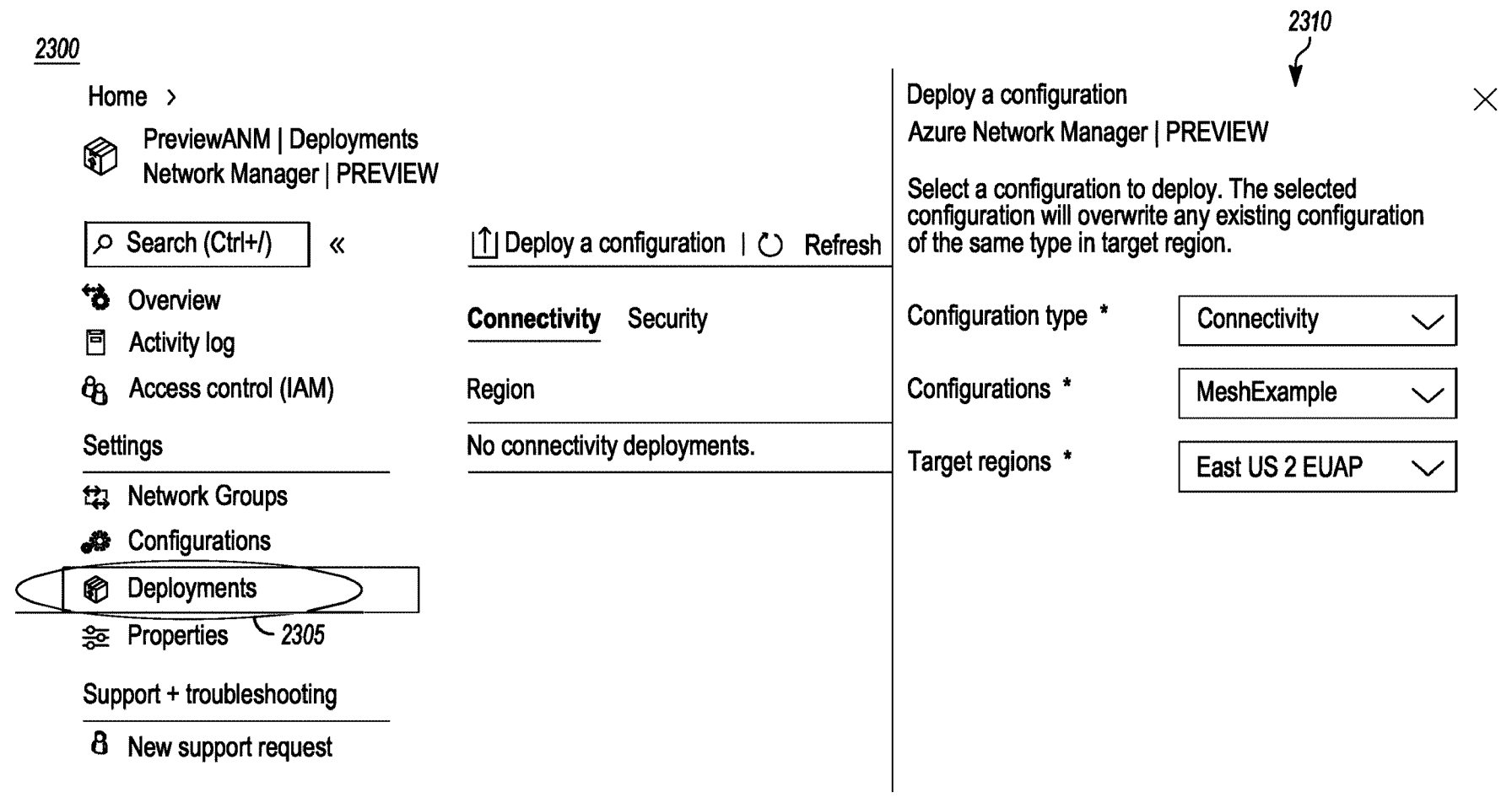

In step 9, the connectivity configuration is committed. As shown in the illustrative UI 2300 in FIG. 23, the "Deployments" control 2305 on the left side is clicked. "Connectivity", the configuration name, and the target regions are specified on the right side 2310 of the UI to commit the connectivity configuration in this illustrative example.

Figure 24:
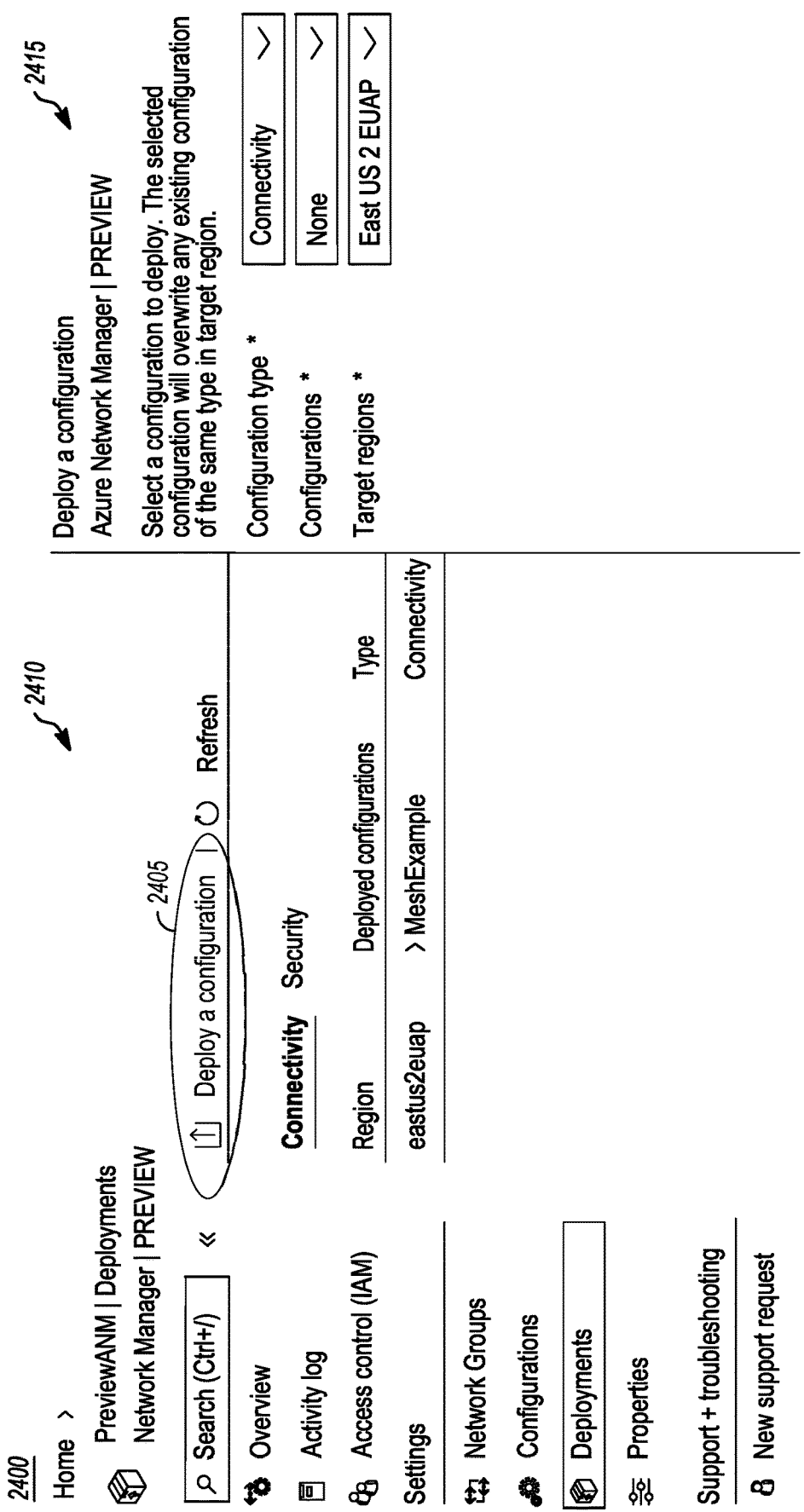
FIG. 24 shows an illustrative UI for un-deploying a connectivity configuration.

In step 10, a virtual network manager may be deleted. The deployed configurations—the connectivity configuration and security administration configuration in this illustrative example—are first un-deployed. Using the illustrative UI 2400 shown in FIG. 24, the "Deploy a configuration" control 2405 is clicked as indicated by reference numeral 2410 on the left side of the figure. The "None" configuration may then be deployed in the region where the configuration was deployed, as indicated by reference numeral 2415 on the right side of the figure. Selecting "None" tells the virtual network manager that no configuration is desired for application to the specified region which thereby un-deploys the currently deployed connectivity configuration.

Figure 25:
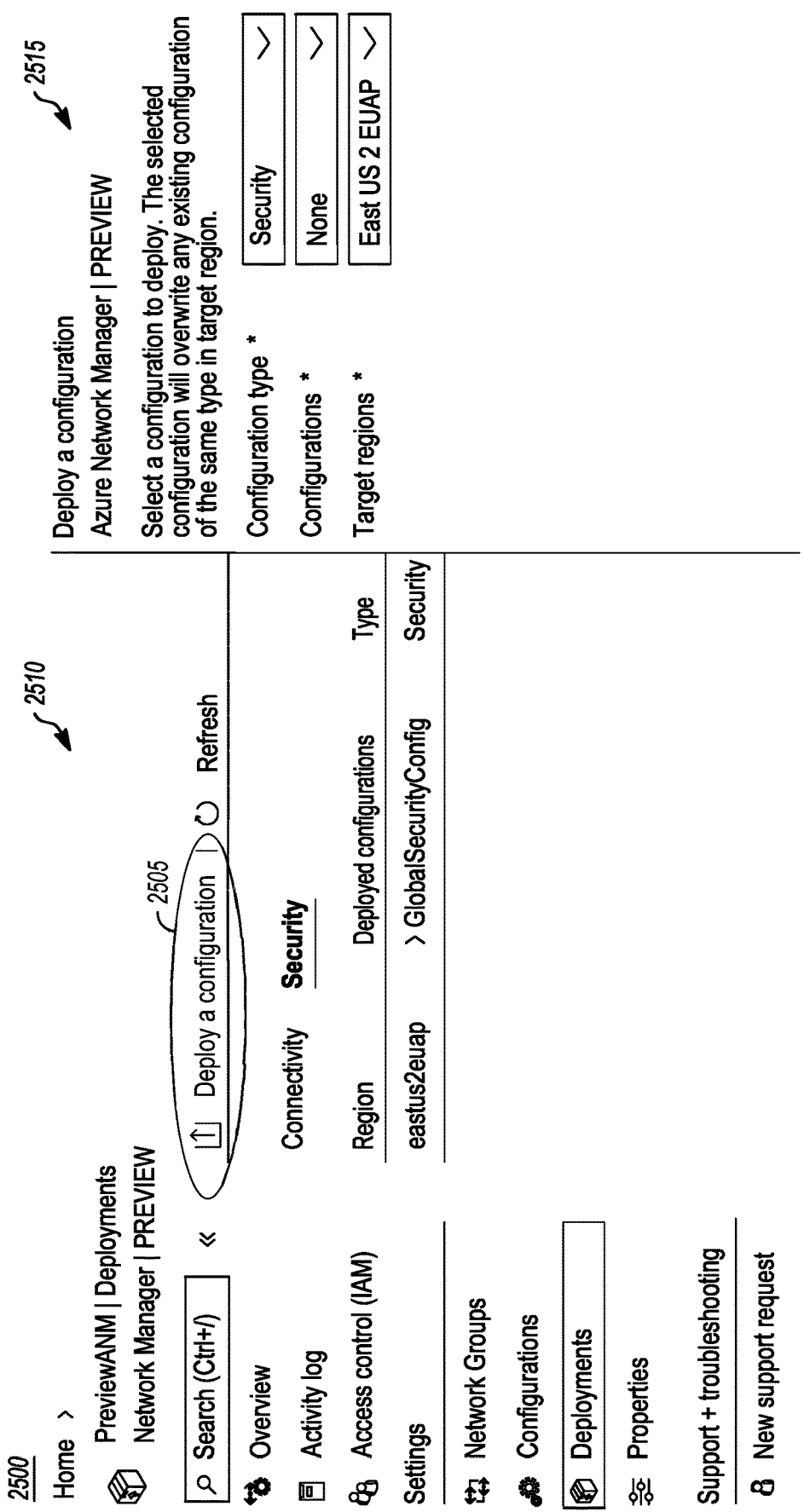
FIG. 25 shows an illustrative UI for un-deploying a security administration configuration.

FIG. 25 shows an illustrative UI 2500 that may be used to un-deploy the security administration configuration. In a similar workflow as with the connectivity configuration, the "Deploy a configuration" control 2505 is clicked as indicated by reference numeral 2510 on the left side of the figure. The "None" configuration may then be deployed in the region where the configuration was deployed, as indicated by reference numeral 2515 on the right side of the figure to thereby un-deploy the currently deployed security administration configuration.

Figure 26:
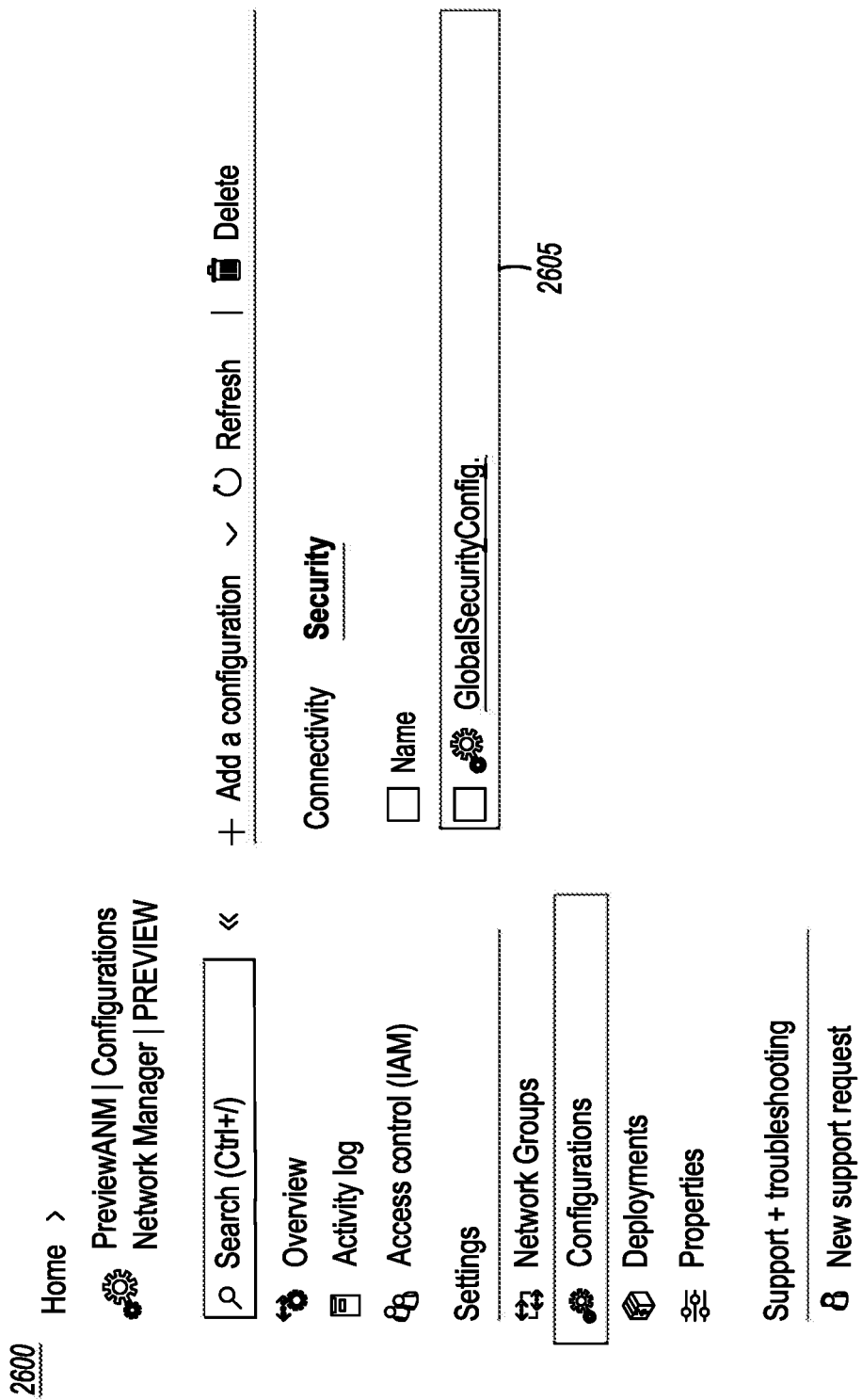
FIG. 26 shows an illustrative UI for deleting a security administration rule.
Figure 27:
FIG. 27 shows an illustrative UI for saving/confirming deletion of a security administration rule.

Continuing with step 10, a security administration rule is deleted. As shown in the illustrative UI 2600 in FIG. 26, the user clicks on the security configuration where the security administration rule exists, as indicated by reference numeral 2605 and deletes. The deletion is saved/confirmed as indicated by reference numeral 2705 in an illustrative UI 2700 shown in FIG. 27.

Figure 28:
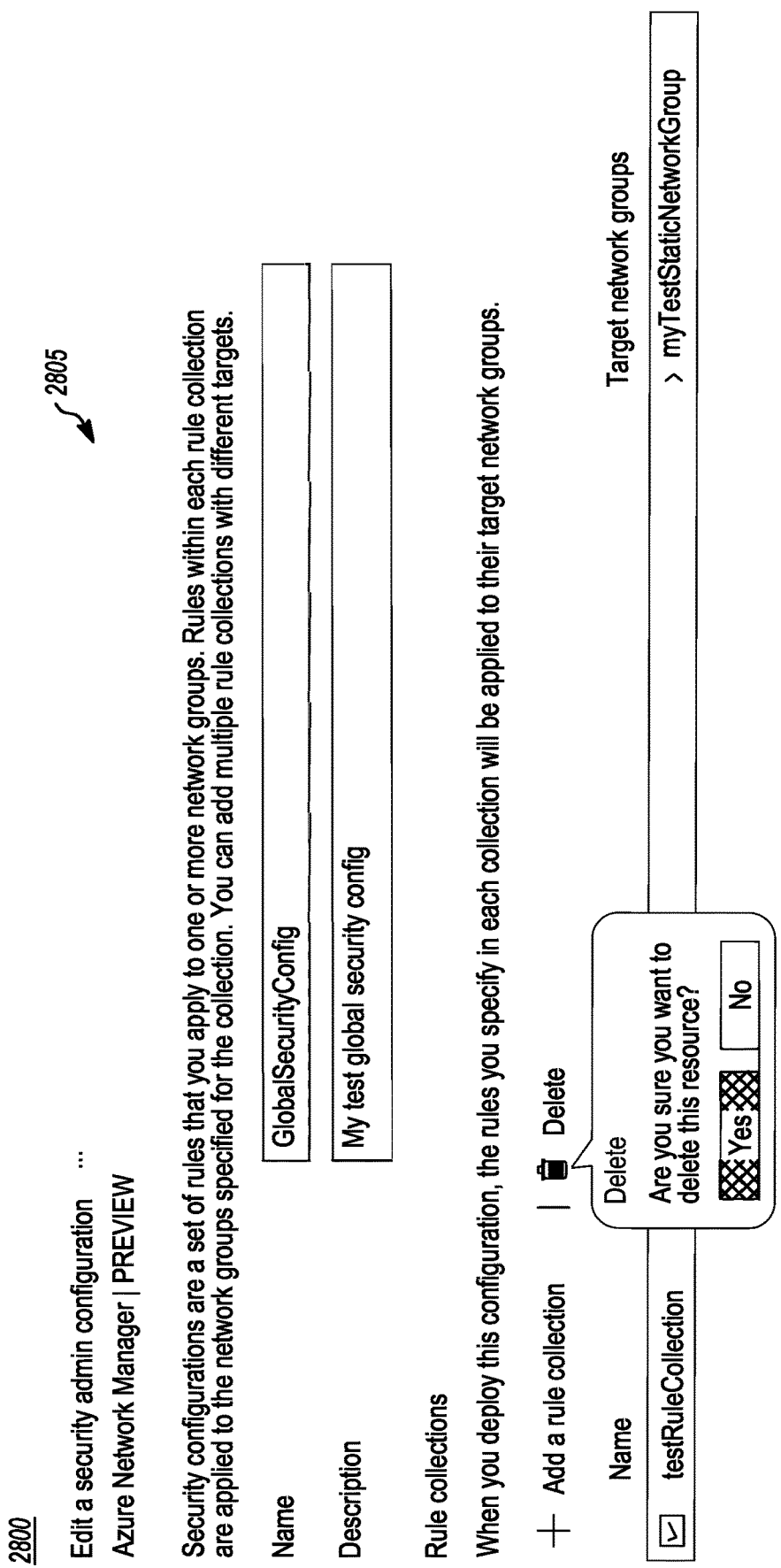
FIG. 28 shows an illustrative UI for saving/confirming deletion of a security administration rule collection.
Figure 29:
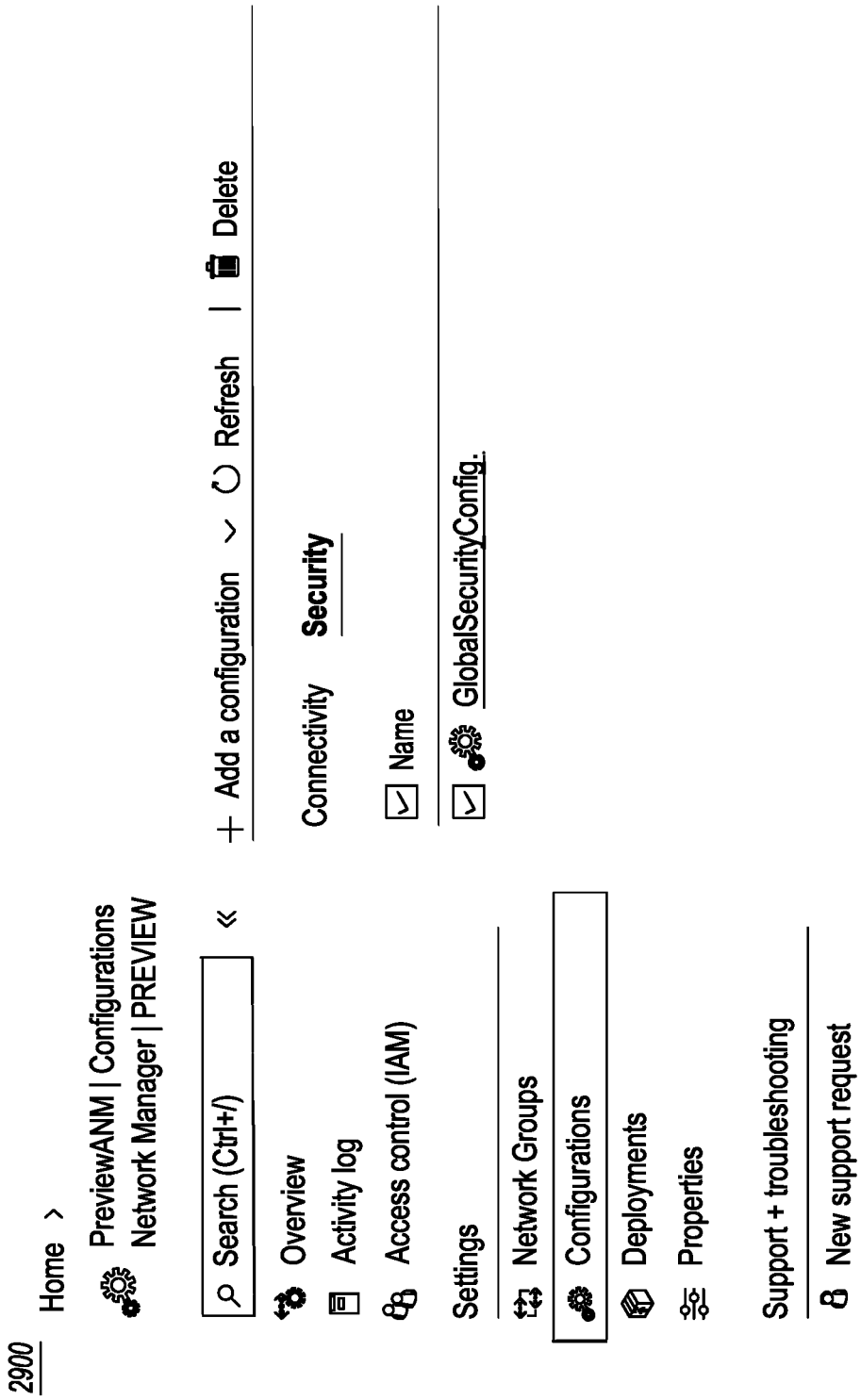
FIG. 29 shows an illustrative UI for deleting a security administration configuration.
Figure 30:
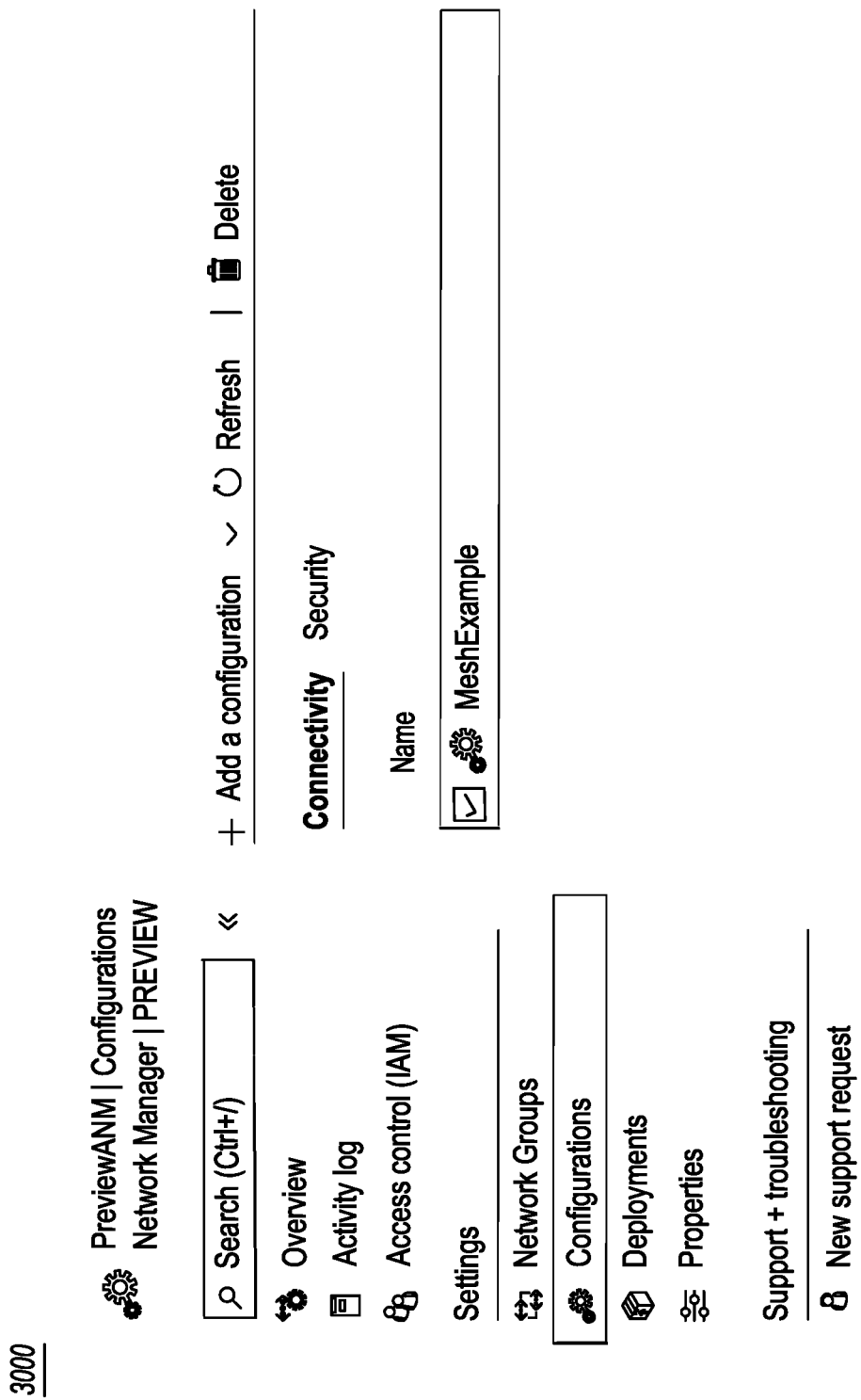
FIG. 30 shows an illustrative UI for deleting a connectivity configuration.

The user can delete a security administration rule collection as indicated by reference numeral 2805 in the illustrative UI 2800 shown in FIG. 28. In the illustrative UI 2900 in FIG. 29, the user checks a security configuration to be deleted. In the illustrative UI 3000 in FIG. 30, the user checks a connectivity configuration to be deleted.

The user checks a network group to be deleted as indicated by reference numeral 3105 in the illustrative UI 3100 shown in FIG. 31. A user checks a virtual network manager for deletion as indicated by reference numeral 3205 in the illustrative UI 3200 shown in FIG. 32. The deletion needs to be confirmed as indicated by reference numeral 3210.

Figure 33:
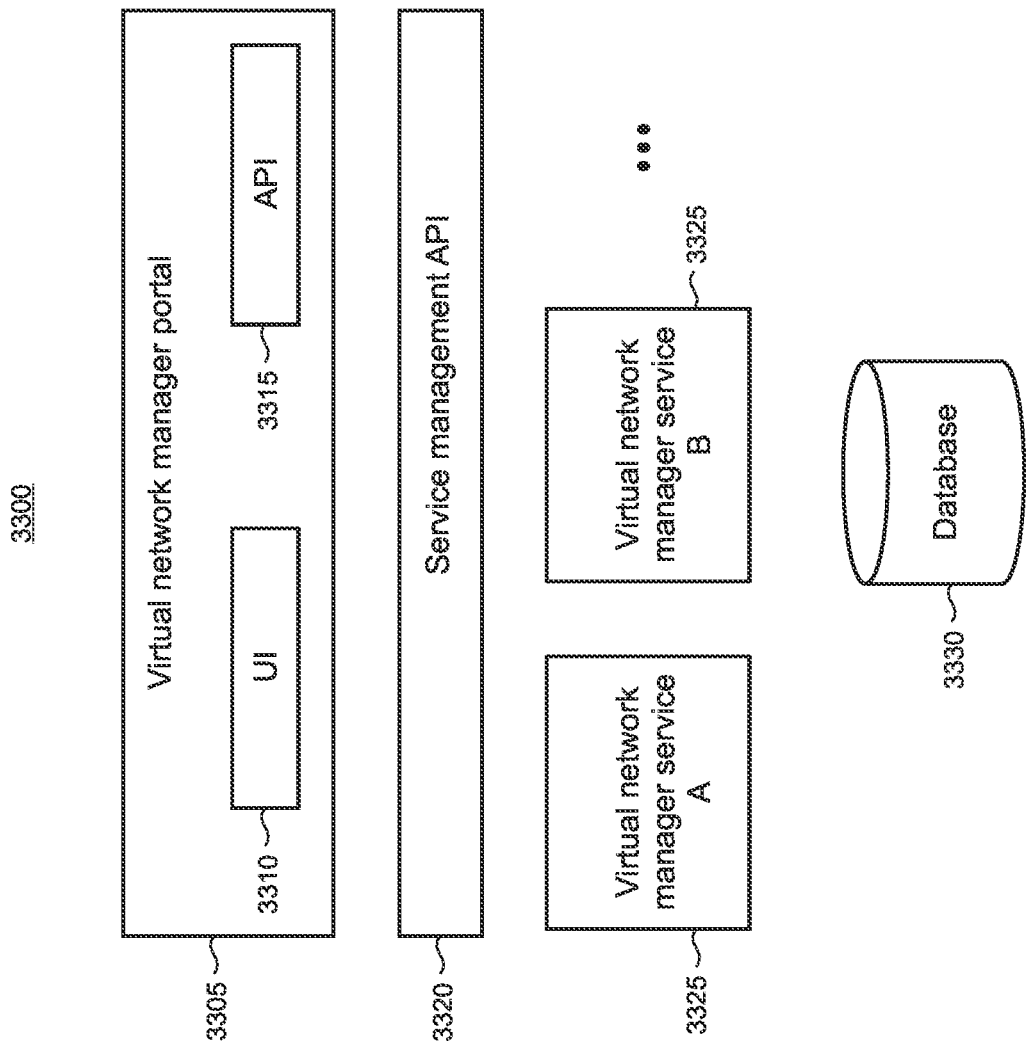
FIG. 33 shows an illustrative cloud-computing architecture that supports a virtual network manager portal.

FIG. 33 shows an illustrative cloud-computing architecture 3300 that may be configured to operate on virtual network infrastructure such as a computer server in a data center. The architecture supports a virtual network manager portal 3305 that comprises a user interface functionality 3310 and an API 3315 that enables interaction with an operating system (e.g., a cloud operating system) and other computing functionalities and/or entities. The virtual network manager portal may be configured to enable users, functionalities, services, and systems, for example, to interact with a virtual network manager as described herein.

Underlying the virtual network manager portal 3305 is a service management API 3320. The service management API provides access, visibility, and/or control with respect to one or more virtual network manager services 3325 that are provided by the virtual network manager. The service management API may also provide access and interactions with a database 3330 that supports the services.

Figure 34:
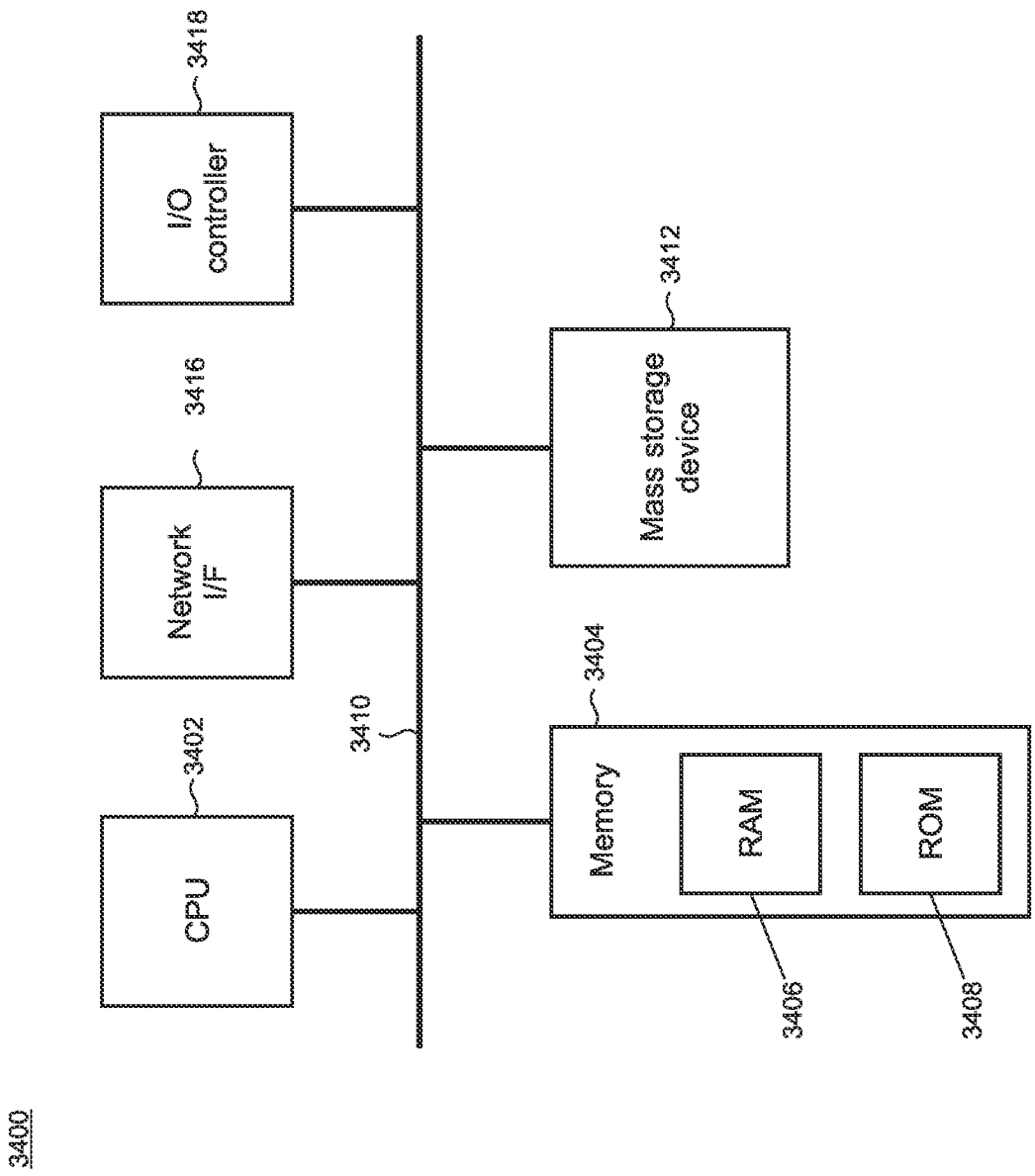
FIG. 34 is a block diagram of an illustrative server or computing device that may be used at least in part to implement the present logical grouping of network resources and control at scale.

FIG. 34 shows an illustrative architecture 3400 for a computing device, such as a server, capable of executing the various components described herein for logical grouping of network resources and control at scale. The architecture 3400 illustrated in FIG. 34 includes one or more processors 3402 (e.g., central processing unit, dedicated AI chip, graphics processing unit, etc.), a system memory 3404, including RAM (random access memory) 3406 and ROM (read only memory) 3408, and a system bus 3410 that operatively and functionally couples the components in the architecture 3400. A basic input/output system containing the basic routines that help to transfer information between elements within the architecture 3400, such as during startup, is typically stored in the ROM 3408. The architecture 3400 further includes a mass storage device 3412 for storing software code or other computer-executed code that is utilized to implement applications, the file system, and the operating system. The mass storage device 3412 is connected to the processor 3402 through a mass storage controller (not shown) connected to the bus 3410. The mass storage device 3412 and its associated computer-readable storage media provide non-volatile storage for the architecture 3400. Although the description of computer-readable storage media contained herein refers to a mass storage device, such as a hard disk or CD-ROM drive, it may be appreciated by those skilled in the art that computer-readable storage media can be any available storage media that can be accessed by the architecture 3400.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 3400.

According to various embodiments, the architecture 3400 may operate in a networked environment using logical connections to remote computers through a network. The architecture 3400 may connect to the network through a network interface unit 3416 connected to the bus 3410. It may be appreciated that the network interface unit 3416 also may be utilized to connect to other types of networks and remote computer systems. The architecture 3400 also may include an input/output controller 3418 for receiving and processing input from a number of other devices, including a keyboard, mouse, touchpad, touchscreen, control devices such as buttons and switches or electronic stylus (not shown in FIG. 34). Similarly, the input/output controller 3418 may provide output to a display screen, user interface, a printer, or other type of output device (also not shown in FIG. 34).

It may be appreciated that the software components described herein may, when loaded into the processor 3402 and executed, transform the processor 3402 and the overall architecture 3400 from a general-purpose computing system into a special-purpose computing system customized to facilitate the functionality presented herein. The processor 3402 may be constructed from any number of transistors or other discrete circuit elements, which may individually or collectively assume any number of states. More specifically, the processor 3402 may operate as a finite-state machine, in response to executable instructions contained within the software modules disclosed herein. These computer-executable instructions may transform the processor 3402 by specifying how the processor 3402 transitions between states, thereby transforming the transistors or other discrete hardware elements constituting the processor 3402.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 3400 in order to store and execute the software components presented herein. It also may be appreciated that the architecture 3400 may include other types of computing devices, including wearable devices, handheld computers, embedded computer systems, smartphones, PDAs, and other types of computing devices known to those skilled in the art. It is also contemplated that the architecture 3400 may not include all of the components shown in FIG. 34, may include other components that are not explicitly shown in FIG. 34, or may utilize an architecture completely different from that shown in FIG. 34.

Figure 35:
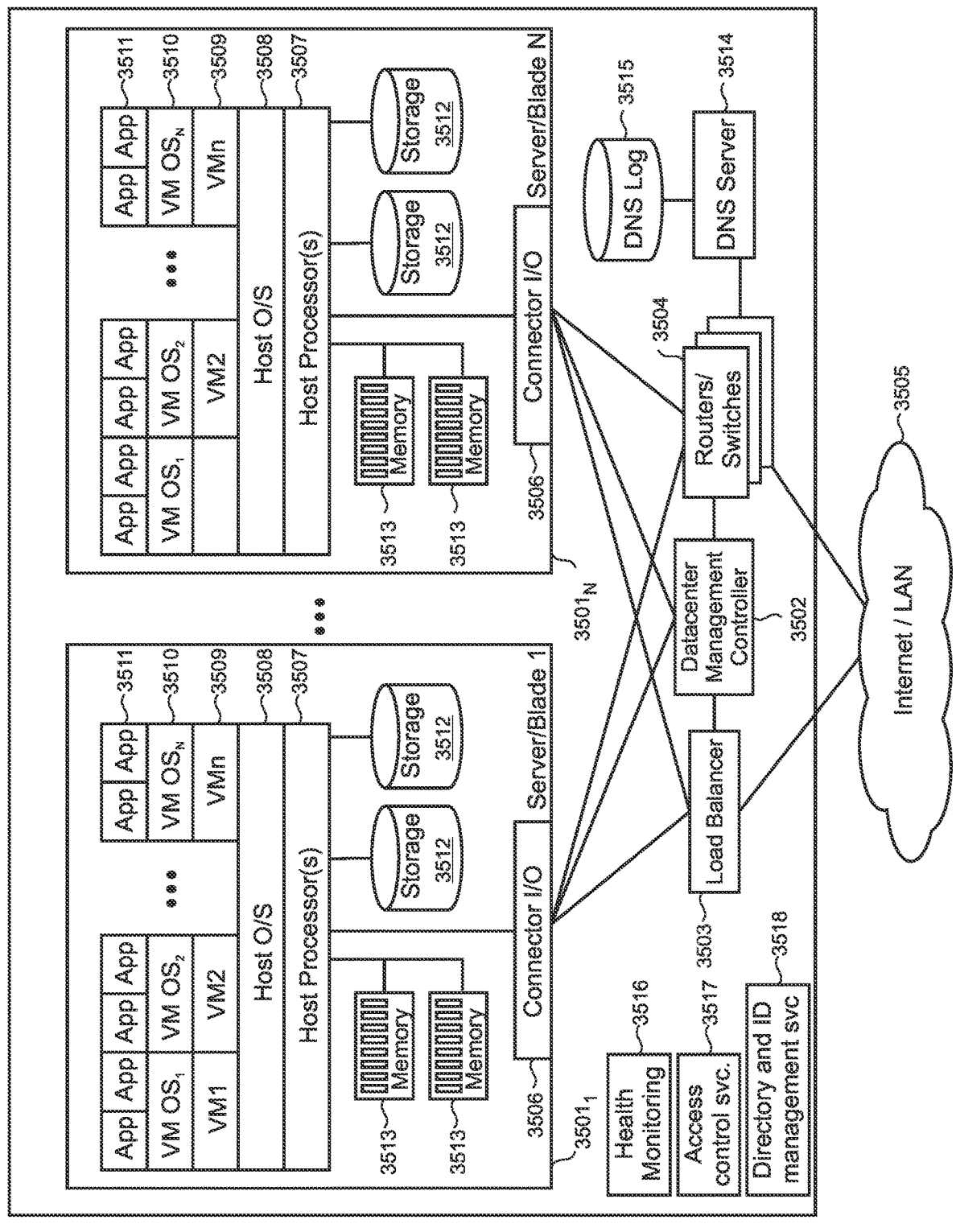
FIG. 35 is a block diagram of an illustrative datacenter that may be used at least in part to implement the present logical grouping of network resources and control at scale.

FIG. 35 is a high-level block diagram of an illustrative datacenter 3500 that provides cloud computing services or distributed computing services that may be used to implement the present logical grouping of network resources and control at scale. Datacenter 3500 may incorporate one or more of the features disclosed in the datacenters shown in the drawings and described in the accompanying text. A plurality of servers 3501 are managed by datacenter management controller 3502. Load balancer 3503 distributes requests and computing workloads over servers 3501 to avoid a situation wherein a single server may become overwhelmed. Load balancer 3503 maximizes available capacity and performance of the resources in datacenter 3500. Routers/switches 3504 support data traffic between servers 3501 and between datacenter 3500 and external resources and users (not shown) via an external network 3505, which may be, for example, a local area network (LAN) or the Internet.

Servers 3501 may be standalone computing devices, and/or they may be configured as individual blades in a rack of one or more server devices. Servers 3501 have an input/output (I/O) connector 3506 that manages communication with other database entities. One or more host processors 3507 on each server 3501 run a host operating system (OS) 3508 that supports multiple virtual machines (VM) 3509. Each VM 3509 may run its own OS so that each VM OS 3510 on a server is different, or the same, or a mix of both. The VM OSs 3510 may be, for example, different versions of the same OS (e.g., different VMs running different current and legacy versions of the Windows® operating system). In addition, or alternatively, the VM OSs 3510 may be provided by different manufacturers (e.g., some VMs running the Windows® operating system, while other VMs are running the Linux® operating system). Each VM 3509 may also run one or more applications (App) 3511. Each server 3501 also includes storage 3512 (e.g., hard disk drives (HDD)) and memory 3513 (e.g., RAM) that can be accessed and used by the host processors 3507 and VMs 3509 for storing software code, data, etc. In one embodiment, a VM 3509 may employ the data plane APIs as disclosed herein.

Datacenter 3500 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 3500 allows tenants to scale up or scale down resources dynamically to meet the current needs of their business. Additionally, a datacenter operator can provide usage-based services to tenants so that they pay for only the resources they use, when they need to use them. For example, a tenant may initially use one VM 3509 on server 3501l to run their applications 3511. When demand for an application 3511 increases, the datacenter 3500 may activate additional VMs 3509 on the same server 3501l and/or on a new server 3501N as needed. These additional VMs 3509 can be deactivated if demand for the application later drops.

Datacenter 3500 may offer guaranteed availability, disaster recovery, and back-up services. For example, the datacenter may designate one VM 3509 on server 3501l as the primary location for the tenant's application and may activate a second VM 3509 on the same or a different server as a standby or back-up in case the first VM or server 3501l fails. The datacenter management controller 3502 automatically shifts incoming user requests from the primary VM to the back-up VM without requiring tenant intervention. Although datacenter 3500 is illustrated as a single location, it will be understood that servers 3501 may be distributed to multiple locations across the globe to provide additional redundancy and disaster recovery capabilities. Additionally, datacenter 3500 may be an on-premises, private system that provides services to a single enterprise user or may be a publicly accessible, distributed system that provides services to multiple, unrelated customers and tenants or may be a combination of both.

Domain Name System (DNS) server 3514 resolves domain and host names into IP addresses for all roles, applications, and services in datacenter 3500. DNS log 3515 maintains a record of which domain names have been resolved by role. It will be understood that DNS is used herein as an example and that other name resolution services and domain name logging services may be used to identify dependencies, for example, in other embodiments, IP or packet sniffing, code instrumentation, or code tracing.

Datacenter health monitoring 3516 monitors the health of the physical systems, software, and environment in datacenter 3500. Health monitoring 3516 provides feedback to datacenter managers when problems are detected with servers, blades, processors, or applications in datacenter 3500 or when network bandwidth or communications issues arise.

Access control service 3517 determines whether users are allowed to access particular connections and services provided at the datacenter 3500. Directory and identity management service 3518 authenticates user credentials for tenants on datacenter 3500.

Figure 36:
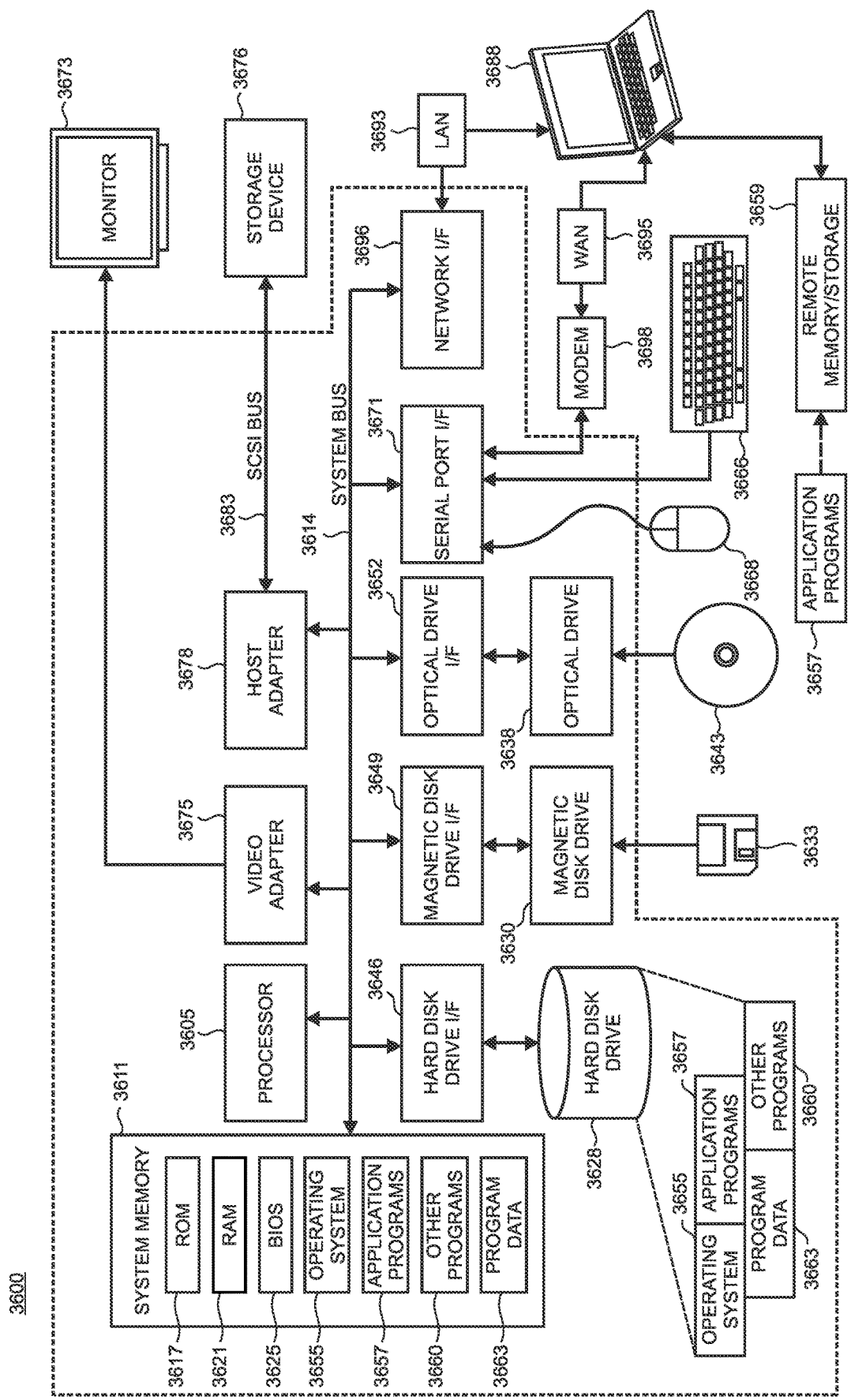
FIG. 36 is a simplified block diagram of an illustrative computer system that may be used at least in part to implement the present logical grouping of network resources and control at scale.

FIG. 36 is a simplified block diagram of an illustrative computer system 3600 such as a PC, client machine, or server with which the present logical grouping of network resources and control at scale may be implemented. Computer system 3600 includes a processor 3605, a system memory 3611, and a system bus 3614 that couples various system components including the system memory 3611 to the processor 3605. The system bus 3614 may be any of several types of bus structures including a memory bus or memory controller, a peripheral bus, or a local bus using any of a variety of bus architectures. The system memory 3611 includes read only memory (ROM) 3617 and random access memory (RAM) 3621. A basic input/output system (BIOS) 3625, containing the basic routines that help to transfer information between elements within the computer system 3600, such as during startup, is stored in ROM 3617. The computer system 3600 may further include a hard disk drive 3628 for reading from and writing to an internally disposed hard disk (not shown), a magnetic disk drive 3630 for reading from or writing to a removable magnetic disk 3633 (e.g., a floppy disk), and an optical disk drive 3638 for reading from or writing to a removable optical disk 3643 such as a CD (compact disc), DVD (digital versatile disc), or other optical media. The hard disk drive 3628, magnetic disk drive 3630, and optical disk drive 3638 are connected to the system bus 3614 by a hard disk drive interface 3646, a magnetic disk drive interface 3649, and an optical drive interface 3652, respectively. The drives and their associated computer-readable storage media provide non-volatile storage of computer-readable instructions, data structures, program modules, and other data for the computer system 3600. Although this illustrative example includes a hard disk, a removable magnetic disk 3633, and a removable optical disk 3643, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present logical grouping of network resources and control at scale. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk 3633, optical disk 3643, ROM 3617, or RAM 3621, including an operating system 3655, one or more application programs 3657, other program modules 3660, and program data 3663. A user may enter commands and information into the computer system 3600 through input devices such as a keyboard 3666 and pointing device 3668 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 3605 through a serial port interface 3671 that is coupled to the system bus 3614, but may be connected by other interfaces, such as a parallel port, game port, or universal serial bus (USB). A monitor 3673 or other type of display device is also connected to the system bus 3614 via an interface, such as a video adapter 3675. In addition to the monitor 3673, personal computers typically include other peripheral output devices (not shown), such as speakers and printers. The illustrative example shown in FIG. 36 also includes a host adapter 3678, a Small Computer System Interface (SCSI) bus 3683, and an external storage device 3676 connected to the SCSI bus 3683.

The computer system 3600 is operable in a networked environment using logical connections to one or more remote computers, such as a remote computer 3688. The remote computer 3688 may be selected as another personal computer, a server, a router, a network PC, a peer device, or other common network node, and typically includes many or all of the elements described above relative to the computer system 3600, although only a single representative remote memory/storage device 3659 is shown in FIG. 36. The logical connections depicted in FIG. 36 include a local area network (LAN) 3693 and a wide area network (WAN) 3695. Such networking environments are often deployed, for example, in offices, enterprise-wide computer networks, intranets, and the Internet.

When used in a LAN networking environment, the computer system 3600 is connected to the local area network 3693 through a network interface or adapter 3696. When used in a WAN networking environment, the computer system 3600 typically includes a broadband modem 3698, network gateway, or other means for establishing communications over the wide area network 3695, such as the Internet. The broadband modem 3698, which may be internal or external, is connected to the system bus 3614 via a serial port interface 3671. In a networked environment, program modules related to the computer system 3600, or portions thereof, may be stored in the remote memory storage device 3690. It is noted that the network connections shown in FIG. 36 are illustrative and other means of establishing a communications link between the computers may be used depending on the specific requirements of an application of the present logical grouping of network resources and control at scale.

Figure 37:
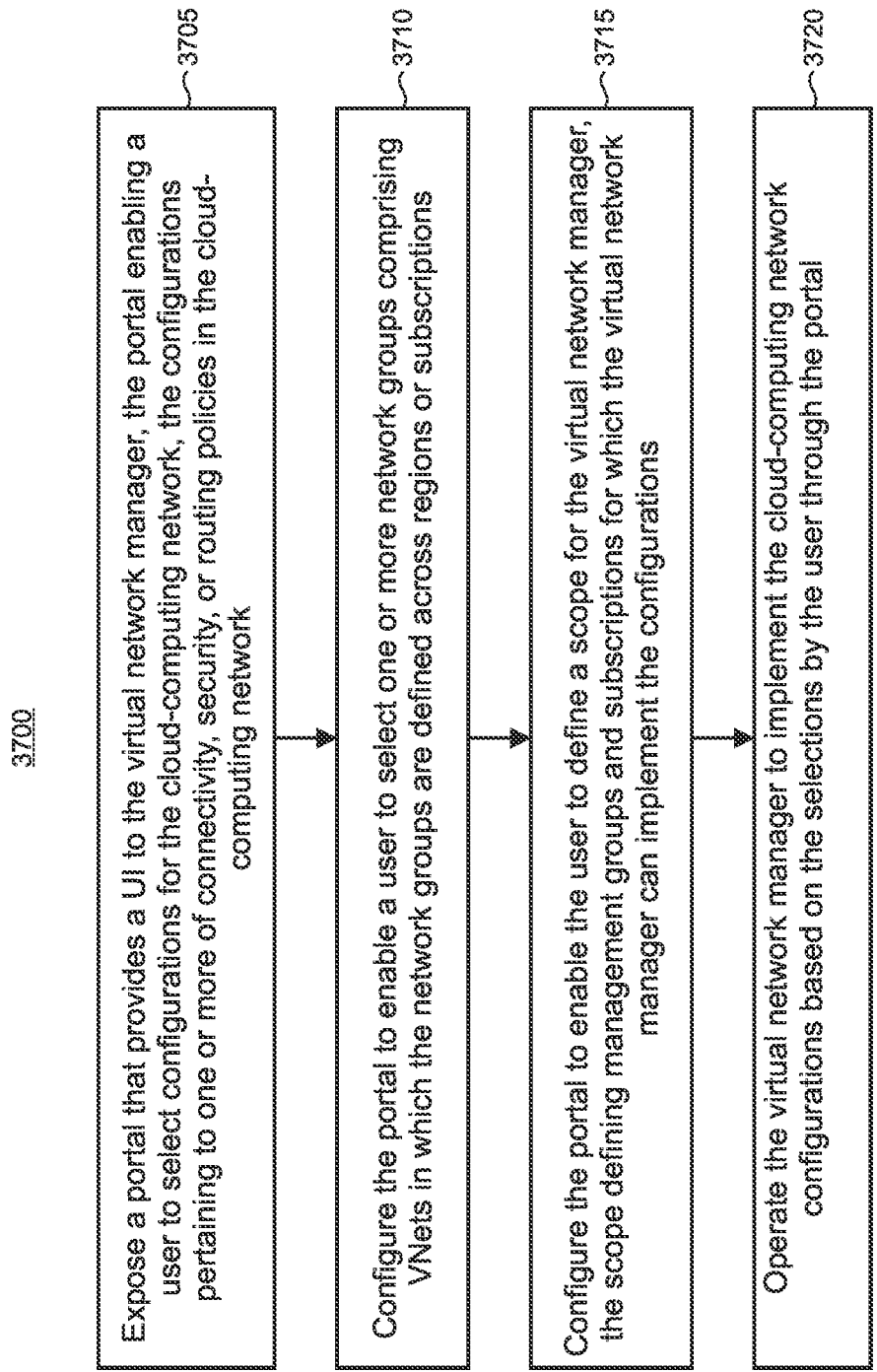
FIGS. 37, 38, and 39 are flowcharts of illustrative methods that may be performed when implementing the present logical grouping of network resources and control at scale.

FIG. 37 is a flowchart of an illustrative method 3700 that by implemented, for example, by a computing device in a cloud network data center. Unless specifically stated, methods or steps shown in the flowchart blocks and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

As shown, block 3705 of the method includes exposing a portal that provides a UI to the virtual network manager, the portal enabling a user to select configurations for the cloud-computing network, the configurations pertaining to one or more of connectivity, security, or routing policies in the cloud-computing network.

Block 3710 includes configuring the portal to enable a user to select one or more network groups comprising VNets in which the network groups are defined across regions or subscriptions. Block 3715 includes configuring the portal to enable the user to define a scope for the virtual network manager, the scope defining management groups and subscriptions for which the virtual network manager can implement the configurations. Block 3720 includes operating the virtual network manager to implement the cloud-computing network configurations based on the selections by the user through the portal.

Figure 38:
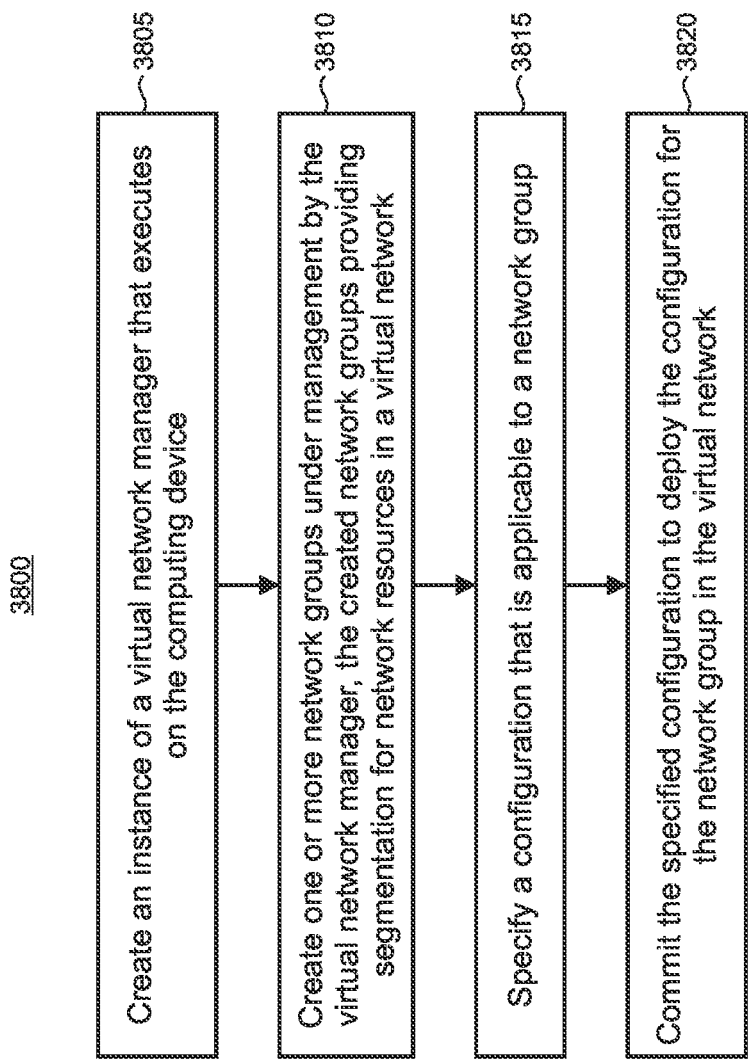

FIG. 38 is a flowchart of an illustrative method 3800 that by implemented, for example, by a computing device in a cloud network data center. At block 3805 of the method, an instance of a virtual network manager is created that executes on the computing device. At block 3810, one or more network groups under management by the virtual network manager are created, the created network groups providing segmentation for network resources in a virtual network.

At block 3815, a configuration is specified that is applicable to a network group. At block 3820, the specified configuration is committed to deploy the configuration for the network group in the virtual network.

Figure 39:
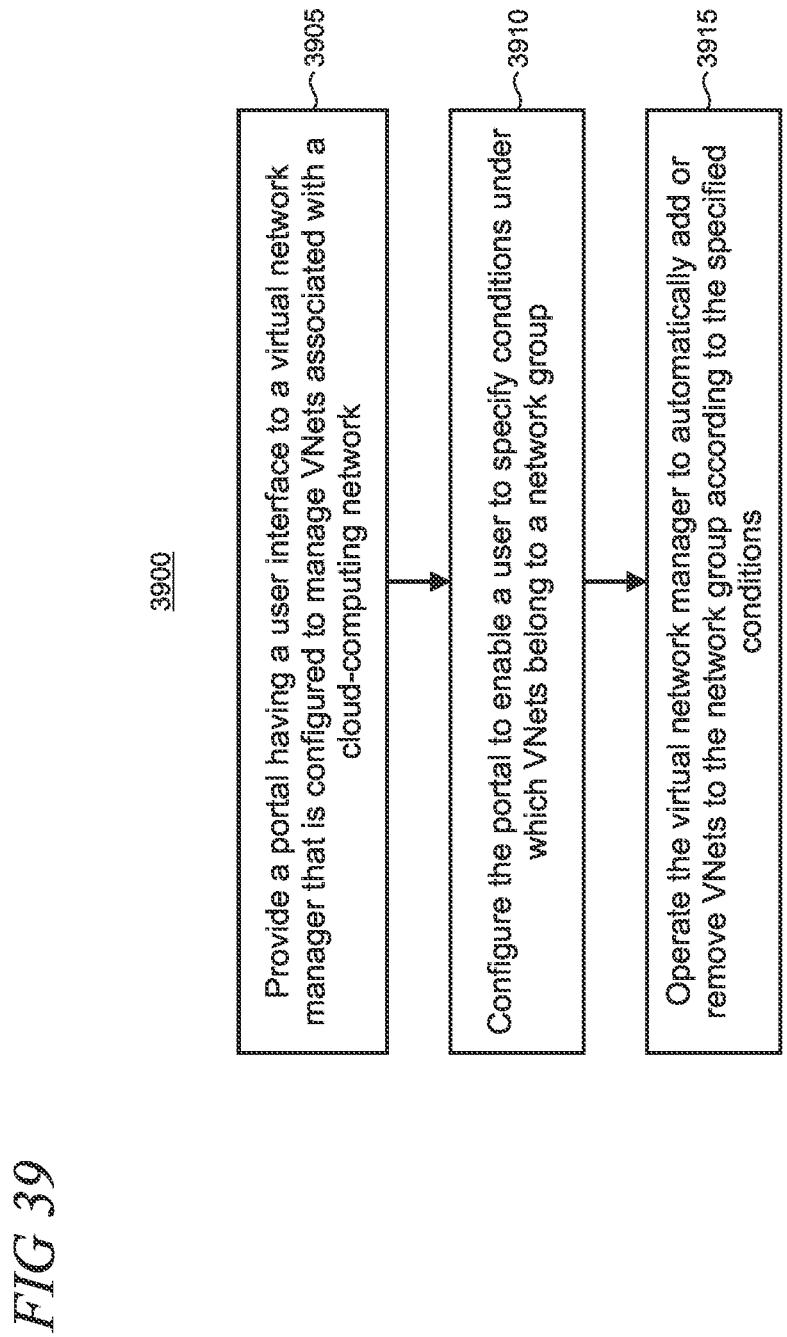

FIG. 39 is a flowchart of an illustrative method 3900 that by implemented, for example, by a computing device in a cloud network data center. At block 3905, a portal is provided having a user interface to a virtual network manager that is configured to manage VNets associated with a cloud-computing network. At block 3910, the portal is configured to enable a user to specify conditions under which VNets belong to a network group. At block 3915, the virtual network manager is operated to automatically add or remove VNets to the network group according to the specified conditions.

Various exemplary embodiments of the present logical grouping of network resources and control at scale are now presented by way of illustration and not as an exhaustive list of all embodiments. An example includes a computer-implemented method for operating a virtual network manager for a cloud-computing network spanning one or more regions, comprising: exposing a portal that provides a user interface (UI) to the virtual network manager, the portal enabling a user to select configurations for the cloud-computing network, the configurations pertaining to one or more of connectivity, security, or routing policies in the cloud-computing network; configuring the portal to enable a user to select one or more network groups comprising virtual networks (VNets) in which the network groups are defined across regions or subscriptions; configuring the portal to enable the user to define a scope for the virtual network manager, the scope defining management groups and subscriptions for which the virtual network manager can implement the configurations; and operating the virtual network manager to implement the cloud-computing network configurations based on the selections by the user through the portal.

In another example, the VNet grouping is performed dynamically or statically. In another example, the connectivity configuration comprises cloud-computing network topology. In another example, the topology comprises one of mesh, hub and spoke, hub and spoke with transitivity, or hub and spoke in which a hub operates as a gateway. In another example, the management group implements a container for subscriptions and provides a level of scope above the subscriptions.

A further example includes one or more non-transitory computer-readable memory devices storing computer-executable instructions which, upon execution by one or more processors disposed in a computing device in a cloud network data center, cause the computing device to expose a virtual network management portal to a user, the portal configured to enable the user to: create an instance of a virtual network manager that executes on the computing device; create one or more network groups under management by the virtual network manager, the created network groups providing segmentation for network resources in a virtual network; specify a configuration that is applicable to a network group; and commit the specified configuration to deploy the configuration for the network group in the virtual network.

In another example, the configuration comprises connectivity or security. In another example, the network resources comprise virtual networks (VNets). In another example, the security configuration comprises rules that are selectable by the user which are applied to a network group. In another example, the rules are automatically applied responsively to changes in network resource membership in the network group.

In another example, the executed instructions further cause the computing device to configure the portal to enable a user to specify a scope for one or more of the virtual network manager or one or more network groups. In another example, the rules are applicable to network resources within the specified scope. In another example, the portal is configured to enable the user to manage network resources using a hierarchy.

In another example, the executed instructions further cause the computing device to configure the portal to enable the user to specify a region sequence and frequency for deploying a configuration.

A further example includes a computing device, comprising: at least one processor; and at least one hardware-based non-transitory computer-readable storage device having computer-executable instructions stored thereon which, when executed by the least one processor, cause the computing device to: provide a portal having a user interface to a virtual network manager that is configured to manage virtual networks (VNets) associated with a cloud-computing network; configure the portal to enable a user to specify conditions under which VNets belong to a network group; and operate the virtual network manager to automatically add or remove VNets to the network group according to the specified conditions.

In another example, the conditions comprise a goal state. In another example, the executed instructions further cause the computing device to configure the portal to enable the user to define security rules that are applicable to the network group. In another example, the security rules override settings defined by a VNet owner. In another example, the executed instructions further cause the computing device to configure the portal to enable the user to define a network group based on one or more of service, function, or environment. In another example, the executed instructions further cause the computing device to configure the portal to enable the user to associate a tag or name with a network group.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method for operating instances of a virtual network manager for a cloud-computing network spanning one or more regions, comprising:
   exposing a portal that provides a user interface (UI) to the instances of the virtual network manager, the portal enabling a user to select configurations for the cloud-computing network, the configurations pertaining to connectivity, security, and routing policies for management groups, subscriptions, and network groups in the cloud-computing network;
   configuring the portal to enable the user to select network groups comprising virtual networks (VNets), wherein the network groups are defined across regions and subscriptions;
   configuring the portal to enable the user to define a scope for a first instance of the virtual network manager, the scope defining management groups, subscriptions, and network groups for which the first instance of the virtual network manager implements the configurations wherein the scope comprises a multi-level hierarchy in which the management groups are at a top level of the hierarchy, the network groups are at a bottom level of the hierarchy, and the subscriptions are at a level between the management groups and the network groups in the hierarchy;
   configuring the portal to enable the user to define a scope for a second instance of the virtual network manager, the scope defining management groups, subscriptions, and network groups for which the second instance of the virtual network manager implements the configurations, wherein the scope of the first instance of the virtual network manager and the scope of the second instance of the virtual network manager overlap for different levels of the hierarchy; and
   operating the virtual network manager to implement the cloud-computing network configurations based on selections by the user through the portal.

2. The computer-implemented method of claim 1 in which the VNet grouping is performed dynamically or statically.

3. The computer-implemented method of claim 1 in which a connectivity configuration comprises cloud-computing network topology.

4. The computer-implemented method of claim 3 in which the topology comprises one of mesh, hub and spoke, hub and spoke with transitivity, or hub and spoke in which a hub operates as a gateway.

5. The computer-implemented method of claim 1 in which a management group implements a container for subscriptions and provides a level of scope above the subscriptions.

6. One or more non-transitory computer-readable memory devices storing computer-executable instructions which, upon execution by one or more processors disposed in a computing device in a cloud network data center, cause the computing device to expose a virtual network management portal to a user, the portal configured to enable the user to:
   create first and second instances of a virtual network manager that executes on the computing device;
   create network groups under management by the instances of the virtual network manager, the created network groups providing segmentation for network resources in a virtual network, wherein the network groups are included in a scope defining management groups, subscriptions, and network groups, the scope comprising a multi-level hierarchy in which management groups are at a top level of the hierarchy, the network groups are at a bottom level of the hierarchy, and the subscriptions are at a level between the management groups and the network groups in the hierarchy;
   define a scope for each of the first and second instances of the virtual network manager, wherein the scope of the first instance of the virtual network manager and the scope of the second instance of the virtual network manager overlap for different levels of the hierarchy;
   specify a configuration that is applicable to a network group; and
   commit the specified configuration to deploy the configuration for the network group in the virtual network.

7. The one or more non-transitory computer-readable memory devices of claim 6 in which the configuration comprises connectivity or security.

8. The one or more non-transitory computer-readable memory devices of claim 6 in which the network resources comprise virtual networks (VNets).

9. The one or more non-transitory computer-readable memory devices of claim 7 in which a security configuration comprises rules that are selectable by the user which are applied to the network group.

10. The one or more non-transitory computer-readable memory devices of claim 9 in which the rules are automatically applied responsively to changes in network resource membership in the network group.

11. The one or more non-transitory computer-readable memory devices of claim 9 in which the executed instructions further cause the computing device to configure the portal to enable the user to specify a scope for one or more of the virtual network manager or one or more network groups.

12. The one or more non-transitory computer-readable memory devices of claim 11 in which the rules are applicable to network resources within the specified scope.

13. The one or more non-transitory computer-readable memory devices of claim 6 in which the portal is configured to enable the user to manage the network resources using the hierarchy.

14. The one or more non-transitory computer-readable memory devices of claim 6 in which the executed instructions further cause the computing device to configure the portal to enable the user to specify a region sequence and frequency for deploying the configuration.

15. A computing device, comprising:
   at least one processor; and
   at least one hardware-based non-transitory computer-readable storage device having computer-executable instructions stored thereon which, when executed by the least one processor, cause the computing device to:
   provide a portal having a user interface to first and second instances of a virtual network manager that is configured to manage virtual networks (VNets) associated with a cloud-computing network;

configure the portal to enable a user to specify conditions under which VNets belong to a network group, wherein the network groups are included in a scope defining management groups, subscriptions, and network groups, the scope comprising a multi-level hierarchy in which management groups are at a top level of the hierarchy, the network groups are at a bottom level of the hierarchy, and the subscriptions are at a level between the management groups and the network groups in the hierarchy;

configure the portal to enable the user to define a scope for each of the first and second instances of the virtual network manager, wherein the scope of the first instance of the virtual network manager and the scope of the second instance of the virtual network manager overlap for different levels of the hierarchy; and operate the first and second instances of the virtual network manager to automatically add or remove VNets to the network group according to the specified conditions.

16. The computing device of claim 15 in which the conditions comprise a goal state.

17. The computing device of claim 15 in which the executed instructions further cause the computing device to configure the portal to enable the user to define security rules that are applicable to the network group.

18. The computing device of claim 17 in which the security rules override settings defined by a VNet owner.

19. The computing device of claim 15 in which the executed instructions further cause the computing device to configure the portal to enable the user to define the network group based on one or more of service, function, or environment.

20. The computing device of claim 15 in which the executed instructions further cause the computing device to configure the portal to enable the user to associate a tag or name with the network group.

* * * * *